United States Patent
Watanabe et al.

(10) Patent No.: US 9,167,212 B2
(45) Date of Patent: Oct. 20, 2015

(54) IMAGE DISPLAYING APPARATUS, IMAGE DISPLAYING SYSTEM, IMAGE DISPLAYING METHOD AND IMAGE DISPLAYING PROGRAM

(75) Inventors: Kazuhiro Watanabe, Tokyo (JP); Masaaki Isozu, Tokyo (JP); Takehiko Sasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 828 days.

(21) Appl. No.: 13/309,735

(22) Filed: Dec. 2, 2011

(65) Prior Publication Data

US 2012/0147200 A1  Jun. 14, 2012

(30) Foreign Application Priority Data

Dec. 9, 2010 (JP) ................. 2010-274781

(51) Int. Cl.
    *H04N 5/225* (2006.01)
    *H04N 9/04* (2006.01)
    *H04N 5/222* (2006.01)
    *H04N 7/18* (2006.01)
    *H04N 5/232* (2006.01)

(52) U.S. Cl.
    CPC ............... *H04N 7/181* (2013.01); *H04N 5/232* (2013.01)

(58) Field of Classification Search
    USPC ........................................ 348/333.01–333.13
    See application file for complete search history.

(56) References Cited

U.S. PATENT DOCUMENTS

| | | | | |
|---|---|---|---|---|
| 6,542,191 | B1 * | 4/2003 | Yonezawa | 348/333.01 |
| 6,760,063 | B1 * | 7/2004 | Kamei | 348/211.8 |
| 7,945,938 | B2 * | 5/2011 | Takanezawa et al. | 725/105 |
| 2003/0206238 | A1 * | 11/2003 | Kawai et al. | 348/333.01 |
| 2004/0246339 | A1 * | 12/2004 | Ooshima et al. | 348/207.1 |
| 2012/0147200 | A1 * | 6/2012 | Watanabe et al. | 348/207.11 |

FOREIGN PATENT DOCUMENTS

JP      2008-205700      9/2008

* cited by examiner

*Primary Examiner* — Roberto Velez
*Assistant Examiner* — Tuan Le
(74) *Attorney, Agent, or Firm* — Hazuki International, LLC

(57) ABSTRACT

The present disclosure provides an image displaying apparatus connected to a first camera and a second camera, on both of which pan/tilt control can be carried out, the image displaying apparatus including: an information acquisition section for acquiring information used for moving a display area over a virtual area obtained by combining a first area with a second area by making the first and second areas adjacent to each other; a control section for monitoring the position of the display area in the virtual area, requesting the first camera to carry out pan/tilt operations when the display area is positioned in the first area before and after a movement of the display area, and requesting the second camera to carry out pan/tilt operations when the display area has been moved from the first area to the boundary with the second area; and an image displaying section for displaying an image.

9 Claims, 16 Drawing Sheets

F I G. 1
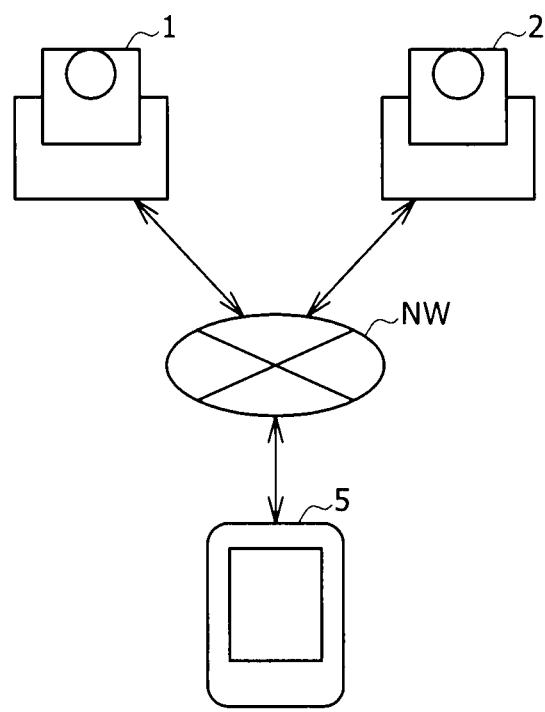

IMAGE DISPLAYING APPARATUS, IMAGE DISPLAYING SYSTEM, IMAGE DISPLAYING METHOD AND IMAGE DISPLAYING PROGRAM

BACKGROUND

The present disclosure relates to an image displaying apparatus, an image displaying system, an image displaying method and an image displaying program.

In the past, there was known an image displaying system making use of a plurality of network cameras. In such a system, a plurality of images are generally displayed on a multi-image screen so that the user is capable of confirming the images. Thus, when the user images a moving object by carrying out pan and/or tilt operations, the user confirms the moving body displayed on the multi-image screen so that the user is capable of carrying out the pan and/or tilt operations while switching a controlled camera from one to another. In the following description, the pan and/or tilt operations are also referred to simply as pan/tilt operations.

With the resolution getting finer and the frame rate becoming higher, however, the amount of data of an image unit also increases. If the amount of data in an image unit increases, it is desirable to reduce the amount of data of the entire image due to a limit of the data transmission capacity and a limit of the data processing performance. Thus, in order to be able of confirming a plurality of images at the same time, it is important to adopt a good method for displaying the images and reduce the amount of data of all the images. Documents such as Japanese Patent Laid-Open No. 2008-205700 disclose a technology for displaying an image taken by making use of a camera being controlled at a high frame rate and for displaying images taken by making use of cameras other than the controlled camera at a low frame rate.

If a plurality of images are displayed on a small-size multi-image screen of an image displaying apparatus such as a portable phone or a portable information terminal, however, the degree of easiness to confirm the displayed images and the degree of easiness to carry out the pan/tilt operations undesirably decrease. It is thus important to show images without regard to images appearing on the multi-image screen and without lowering the degree of easiness to carry out the pan/tilt operations.

SUMMARY

It is thus desirable to provide an image displaying apparatus capable of displaying images with a high degree of efficiency while maintaining the degree of easiness to confirm the displayed images and the degree of easiness to carry out pan/tilt operations. It is further desirable to provide an image displaying system employing the image displaying apparatus, an image displaying method to be adopted by the image displaying apparatus and an image displaying program implementing the image displaying method.

In accordance with an embodiment of the present disclosure, there is provided an image displaying apparatus connected to a first camera and a second camera, on both of which pan/tilt control can be carried out, by communication lines. The image displaying apparatus includes:

an information acquisition section for acquiring information used for moving a display area over a virtual area obtained by combining a first area serving as the pan/tilt range of the first camera with a second area serving as the pan/tilt range of the second camera by making the first and second areas adjacent to each other. The image displaying apparatus further includes:

a control section for monitoring the position of the display area in the virtual area, requesting the first camera to carry out pan/tilt operations to receive an image of the display area when the display area is positioned in the first area before and after a movement of the display area, and requesting the second camera to carry out pan/tilt operations to receive an image of the display area when the display area has been moved from the first area to the boundary between the first and second areas; and an image displaying section for displaying an image received from the first or second camera as an image of the display area.

In addition, it is also possible to provide a configuration in which, after requesting the second camera to carry out pan/tilt operations to receive an image of the display area when the display area has been moved from the first area to the boundary between the first and second areas, in a state of displaying an image included in the first area, the control section requests the first camera to terminate transmission of the image included in the first area and requests the second camera to start transmission of an image included in the second area.

In addition, it is also possible to provide a configuration in which, the virtual area is an area obtained by combining the first and second areas with each other and by partially superposing the first and second areas on each other and thus has an overlap area obtained by superposing a portion of the first area on a portion of the second area.

When the display area has been moved from the first area to the boundary between the first and second areas, the control section requests:

the second camera to carry out pan/tilt operations to follow the display area moving over the overlap area;

the first camera to carry out pan/tilt operations to follow the display area moving over the overlap area till the position of the imaging area of the first camera coincides with the position of the imaging area of the second camera; and the first camera to terminate transmission of an image included in the first area and the second camera to start transmission of an image included in the second area as the position of the imaging area of the first camera coincides with the position of the imaging area of the second camera.

In addition, it is also possible to provide a configuration in which:

zoom control can be carried out on the first and second cameras;

the information acquisition section further acquires information used for enlarging and contracting the display area; and the control section requests the second camera to carry out zoom operation to receive an image of the display area when the display area has been moved from the first area to the boundary between the first and second areas.

In addition, it is also possible to provide a configuration in which the information acquisition section acquires operation information used for moving the display area from the user.

In addition, it is also possible to provide a configuration in which the information acquisition section acquires object detection information used for moving the display area capturing an object, which is moving in the virtual area, in the virtual area by following the movement of the object from the first or second camera.

In addition, in accordance with another embodiment of the present disclosure, there is provided an image displaying system including a first camera and a second camera, on both of which pan/tilt control can be carried out, as well as an image displaying apparatus connected to the first camera and the second camera through communication lines.

In addition, in accordance with a further embodiment of the present disclosure, there is provided an image displaying method making use of a first camera and a second camera, on both of which pan/tilt control can be carried out, as well as an image displaying apparatus connected to the first and second cameras by communication lines. The image displaying method includes:

acquiring information used for moving a display area over a virtual area obtained by combining a first area serving as the pan/tilt range of the first camera with a second area serving as the pan/tilt range of the second camera by making the first and second areas adjacent to each other; and monitoring the position of the display area in the virtual area. The image displaying method further includes:

requesting the first camera to carry out pan/tilt operations to receive an image of the display area when the display area is positioned in the first area before and after a movement of the display area;

requesting the second camera to carry out pan/tilt operations to receive an image of the display area when the display area has been moved from the first area to the boundary between the first and second areas; and displaying an image received from the first or second camera as an image of the display area.

In addition, in accordance with a still further embodiment of the present disclosure, there is provided an image displaying program to be executed by a computer in order to implement the image processing method described above. The program can be presented to the user by making use of a recording medium used for storing the program in advance or presented to the user through communication section or the like.

In accordance with the present disclosure, it is possible to provide an image displaying apparatus capable of displaying images with a high degree of efficiency while maintaining the degree of easiness to confirm the displayed images and the degree of easiness to carry out pan/tilt operations. In addition, it is also to provide an image displaying system employing the image displaying apparatus, an image displaying method to be adopted by the image displaying apparatus and an image displaying program implementing the image displaying method.

BRIEF DESCRIPTION OF THE DRAWINGS

FIG. 1 is a diagram showing the configuration of a general image displaying system;

DETAILED DESCRIPTION OF THE PREFERRED EMBODIMENTS

Figure 2:
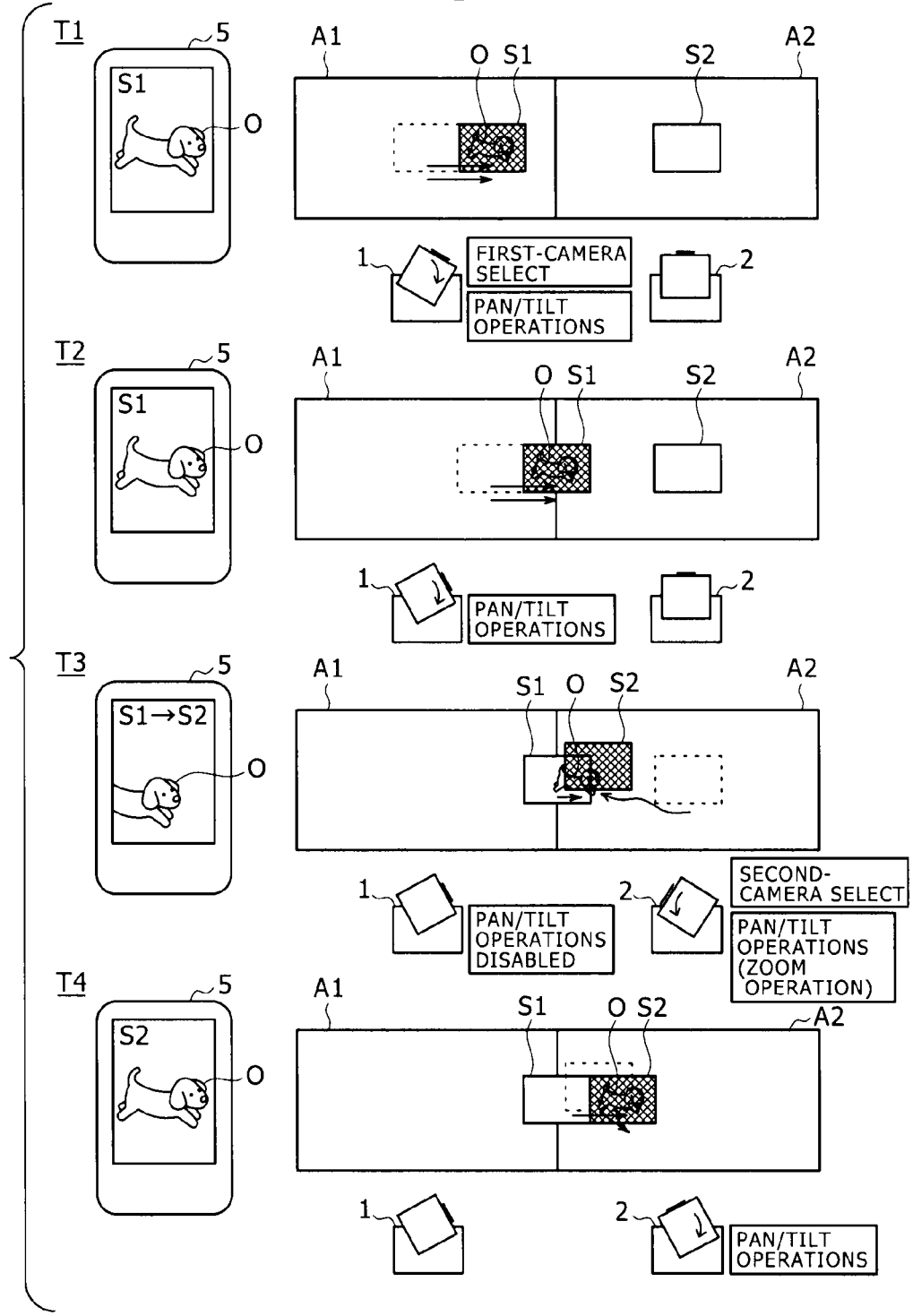
FIG. 2 is a diagram showing typical events taking place in the general image displaying system shown in FIG. 1.

Preferred embodiments of the present disclosure are explained below in detail by referring to the diagrams as follows. It is to be noted that, in the specification of the present disclosure and the diagrams, configuration elements having virtually identical functional configurations are each denoted by the same reference numeral so that such configuration elements need to be explained once. Thus, it is possible to avoid duplications of explanations.

[1: General Image Displaying System]

First of all, a general image displaying system is explained by referring to FIGS. 1 and 2 as follows.

FIG. 1 is a diagram showing the configuration of the general image displaying system. The general image displaying system has at least a first camera 1, a second camera 2 and an image displaying apparatus 5 which is connected to the first camera 1 and the second camera 2 by a network NW. As shown in FIG. 1, in the general image displaying system, the first camera 1 and the second camera 2 are arranged typically in the horizontal direction.

The image displaying apparatus 5 controls the first camera 1 and the second camera 2 in accordance with typically an operation carried out by the user. In accordance with the control, the first camera 1 and the second camera 2 carry out pan/tilt operations and a zoom operation. The first camera 1 and the second camera 2 transmit image data satisfying imaging conditions such as the pan/tilt angles and the zoom ratio to the image displaying apparatus 5. The image displaying apparatus 5 displays an image based on the image data received from the first camera 1 and the second camera 2 on a display screen.

FIG. 2 is a diagram showing typical events and operations carried out by the general image displaying system shown in FIG. 1 for the events. The following description explains operations to capture the image of a moving object O and display the image. The moving object O is moving from a first area A1 serving as the pan/tilt range of the first camera 1 to a second area A2 serving as the pan/tilt range of the second camera 2.

In a state T1 shown in FIG. 2, the moving object O is moving in the left-to-right direction over the first area A1 toward the second area A2. The user selects the first camera 1 as a subject of control and operates the first camera 1 to carry out pan/tilt operations in order to capture the moving object O in a first imaging area S1 which is the imaging area of the first camera 1. The first camera 1 carries out pan/tilt operations in order to capture the moving object O in the first imaging area S1 so that the image displaying apparatus 5 is capable of displaying the image of the moving object O captured by the first camera 1 in the first imaging area S1.

In a state T2, the moving object O has reached the boundary between the first area A1 and the second area A2. The user operates the first camera 1 to carry out pan/tilt operations in order to capture the moving object O in the first imaging area S1. The first camera 1 carries out pan/tilt operations to reach the right edge of the first area A1 so that the image displaying apparatus 5 displays the image of the moving object O captured by the first camera 1 in the first imaging area S1.

In a state T3, the moving object O is further making a movement in the left-to-right direction. The user makes an attempt to operate the first camera 1 to carry out pan/tilt operations in order to capture the moving object O in the first imaging area S1. Since the first camera 1 has carried out pan/tilt operations to reach the right edge of the first area A1, however, the first camera 1 is no longer capable of carrying out pan/tilt operations to move in the left-to-right direction.

Thus, in order to capture the moving object O in a second imaging area S2 serving as the imaging area of the second camera 2, the user manually switches the subject of control from the first camera 1 to the second camera 2. Then, the user operates the second camera 2 to carry out pan/tilt operations to move in the right-to-left direction so as to capture the moving object O in the second imaging area S2. If necessary, the user operates the second camera 2 to also carry out a zoom operation. The second camera 2 carries out pan/tilt operations to move to the neighborhood of the left edge of the second camera 2 and, if necessary, the second camera 2 also carries out a zoom operation. As a result, the image displaying apparatus 5 displays the image of the moving object O captured by the second camera 2 in the second imaging area S2. In the state T3, the user manually switches the subject of control from the first camera 1 to the second camera 2 and the area of the movement of the moving object O changes from the first area A1 to the second area A2. Thus, the moving object O cannot be captured continuously so that the image of the moving object O cannot be displayed continuously. As a result, there is generated a situation in which the moving object O cannot be captured well.

In a state T4, the moving object O is making a movement over the second area A2 in the left-to-right direction. The user operates the second camera 2 to carry out pan/tilt operations to move in the left-to-right direction so as to capture the moving object O in the second imaging area S2. The second camera 2 carries out pan/tilt operations to move in the left-to-right direction. As a result, the image displaying apparatus 5 displays the image of the moving object O captured by the second camera 2 in the second imaging area S2.

As described above, in order to capture the moving object O continuously so as to display the image of the moving object O also continuously, the user must manually switch the subject of control from the first camera 1 to the second camera 2. In addition, after the operation to switch the subject of control from the first camera 1 to the second camera 2, the user must also manually operate the second camera 2 to carry out pan/tilt operations and, if necessary, a zoom operation while confirming the appearance of the image of the moving object O on the image displaying apparatus 5 in order to capture the moving object O in the second imaging area S2. Thus, it inevitably takes much time and much labor to recapture the moving object O in the second imaging area S2.

[2: Configuration of the Image Displaying Apparatus According to Embodiment of the Disclosure]

Figure 3:
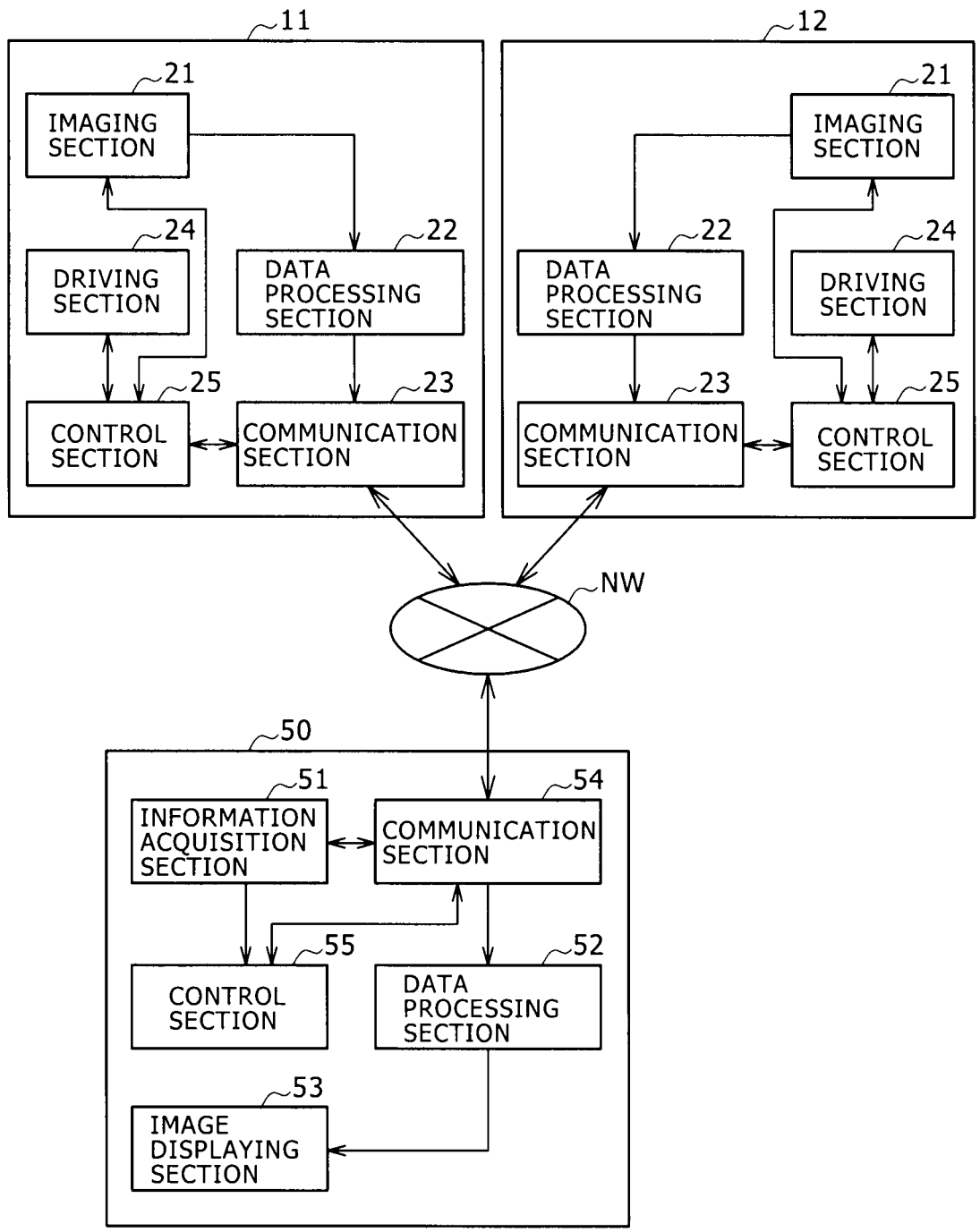
FIG. 3 is a diagram showing the functional configuration of an image displaying system according to an embodiment of the present disclosure.

Next, the configuration of an image displaying apparatus according to an embodiment of the present disclosure is explained by referring to FIG. 3.

FIG. 3 is a diagram showing the functional configuration of the image displaying system according to the embodiment of the present disclosure. As shown in FIG. 3, the image displaying system has at least a first camera 11, a second camera 12 and an image displaying apparatus 50 which is connected to the first camera 11 and the second camera 12 by a network NW. Each of the first camera 11 and the second camera 12 has a pan/tilt function and may also be provided with a zoom function. The image displaying apparatus 50 is an apparatus having a display screen with a small size. Typical examples of the image displaying apparatus 50 include a portable phone and a portable information terminal. The network NW can be a wire network such as the Ethernet (a registered trademark) or an optical-fiber network or can be a radio network such as a radio LAN (local area network), the W-CDMA (wideband code division multiple access) or the GSM (global system for mobile communications).

As shown in FIG. 3, each of the first camera 11 and the second camera 12 which compose the image displaying system employs an imaging section 21, a data processing section 22, a communication section 23, a driving section 24 and a control section 25. The imaging section 21 images an imaging object in the first imaging area S1 or the imaging section 21 by making use of an imaging device not shown in the figure and supplies an imaging signal representing the image to the data processing section 22. The data processing section 22 generates image data from the imaging signal and carries out a compression-coding process on the image data. Then, the data processing section 22 supplies image data obtained as a result of the compression-coding process to the communication section 23. The communication section 23 receives a control signal from the image displaying apparatus 50 and supplies the control signal to the control section 25. In addition, the communication section 23 also packetizes the image data received from the data processing section 22 and transmits the packetized image data to the image displaying apparatus 50. On the basis of a control signal received from the control section 25, the driving section 24 drives a pan/tilt mechanism and a zoom mechanism which are both not shown in the figure. On the basis of a control signal received from the image displaying apparatus 50, the control section 25 supplies a control signal to the imaging section 21, the communication section 23 and the driving section 24 in order to control operations carried out by the first camera 11 or the second camera 12. The operations carried out by the first camera 11 or the second camera 12 include imaging operations carried out by the imaging section 21, data communications carried out by the communication section 23 and the pan/tilt operations and the zoom operation which are carried out by the driving section 24.

The image displaying apparatus 50 employed in the image displaying system includes an information acquisition section 51, a data processing section 52, an image displaying section 53, a communication section 54 and a control section 55.

The information acquisition section 51 acquires various kinds of information from the user and supplies the information to the control section 55. The information acquired by the information acquisition section 51 is information on movements to be made by a display area AD in a virtual area AV in the upward, downward, right-to-left and left-to-right directions as well as information to be used for enlarging and contracting the display area AD. The virtual area AV is an area obtained as a result of combining the first area A1 with the second area A2. It is to be noted that the virtual area AV will be described later in detail. The information acquisition section 51 according to the embodiment acquires the information through devices such as a touch panel, keys and buttons.

The communication section 54 receives image data from the first camera 11 and the second camera 12, de-packetizing the image data. Then, the communication section 54 supplies the de-packetized image data to the data processing section 52. In addition, the communication section 54 also transmits control signals received from the control section 55 to the first camera 11 and the second camera 12. The data processing section 52 carries out a decompression-decoding process on the image data received from the communication section 54 and supplies image data obtained as a result of the decompression-decoding process to the image displaying section 53. The image displaying section 53 displays an image based on the image data received from the data processing section 52. The image displaying section 53 is typically an LCD (liquid crystal display) or OLED (organic light-emitting diode) display unit.

The control section 55 has a CPU (central processing unit), a ROM (read only memory) and a RAM (random access memory). In general, the CPU reads out a program from the ROM or the like and loads the program to the RAM. Then, the CPU executes the program loaded in the RAM in order to control operations carried out by the image displaying apparatus 50. In particular, the control section 55 determines the position of the display area AD in the virtual area AV in accordance with the information received from the information acquisition section 51. Then, when the display area AD is positioned in the first area A1 before and after a movement of the display area AD, the control section 55 requests the first camera 11 to carry out pan/tilt operations to receive an image of the display area AD. In addition, the control section 55 requests the second camera 12 to carry out pan/tilt operations to receive an image of the display area AD when the display area AD has been moved from the first area A1 to at least the boundary between the first area A1 and the second area A2.

[3: Image Displaying System According to First Embodiment]

Next, by referring to FIGS. 4 to 7, the following description explains operations carried out in the image displaying system according to a first embodiment.

Figure 4:
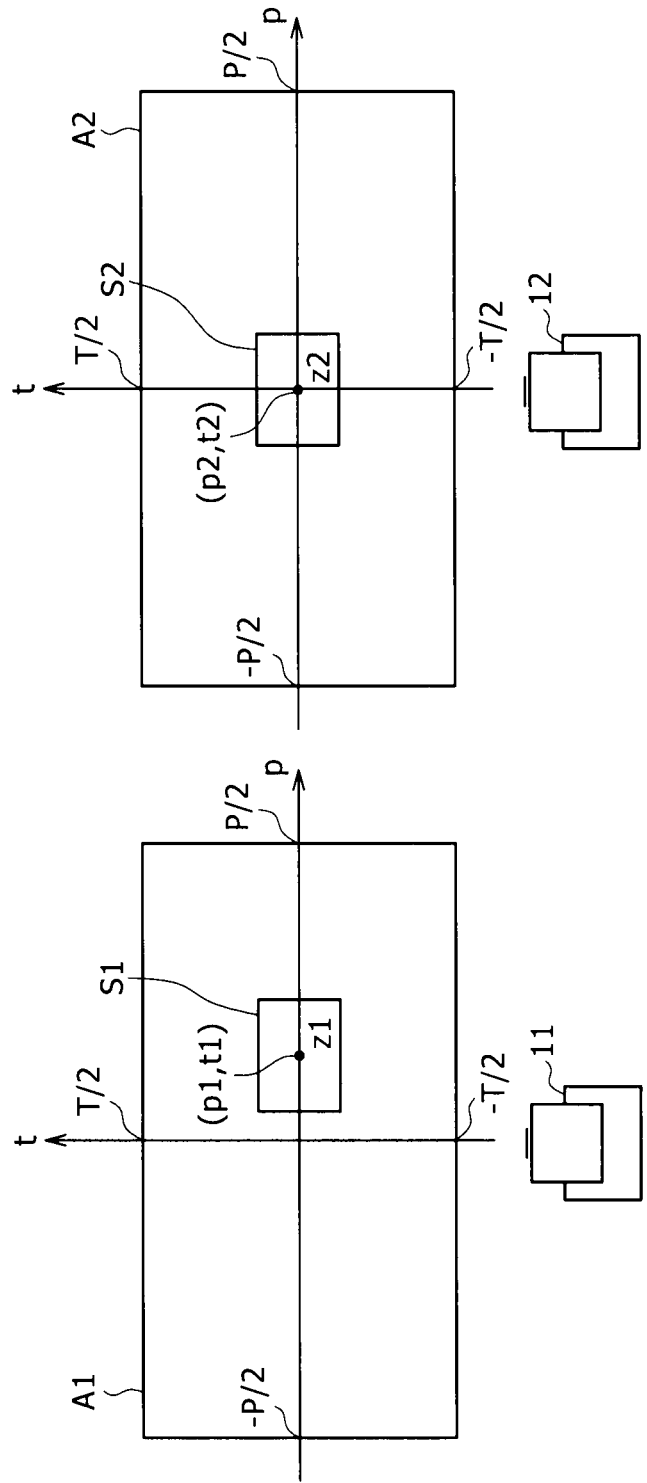
FIG. 4 is a diagram showing pan/tilt ranges of first and second cameras.

FIG. 4 is a diagram showing the pan/tilt range of the first camera 11 and the pan/tilt range of the second camera 12 as a first area A1 and a second area A2 respectively. With the front-face direction of the first camera 11 and the second camera 12 taken as a direction corresponding to a pan angle of 0 degrees, a pan range is typically a pan-angle range from $-P/2$ at the left-direction end to $+P/2$ at the right-direction end where notation P denotes the maximum pan angle. In addition, with the front-face direction of the first camera 11 and the second camera 12 taken as a direction corresponding to a tilt angle of 0 degrees, a tilt range is typically a tilt-angle range from $-T/2$ at the depression-angle-direction end to $+T/2$ at the elevation-angle-direction end where notation T denotes the maximum tilt angle. It is to be noted that, with the front-face direction of the first camera 11 and the second camera 12 taken as a reference, the pan/tilt angles are each an angle formed by the front-face direction and the direction of the optical axis of an imaging lens which is oriented after pan/tilt operations have been carried out. The pan/tilt angles of the first camera 11 indicate the direction of the center of the first imaging area S1 whereas the pan/tilt angles of the second camera 12 indicate the direction of the center of the second imaging area S2.

FIG. 4 shows both the first imaging area S1 and the second imaging area S2. The first imaging area S1 is moved in the first area A1 as a result of pan/tilt operations carried out by the first camera 11 and zoomed in or zoomed out as a result of a zoom operation carried out by the first camera 11. Imaging conditions of the first camera 11 are represented by a pan angle $p1$, a tilt angle $t1$ and a zoom ratio $z1$. By the same token, the second imaging area S2 is moved in the second area A2 as a result of pan/tilt operations carried out by the second camera 12 and zoomed in or zoomed out as a result of a zoom operation carried out by the second camera 12. Imaging conditions of the second camera 12 are represented by a pan angle $p2$, a tilt angle $t2$ and a zoom ratio $z2$.

Figure 5:
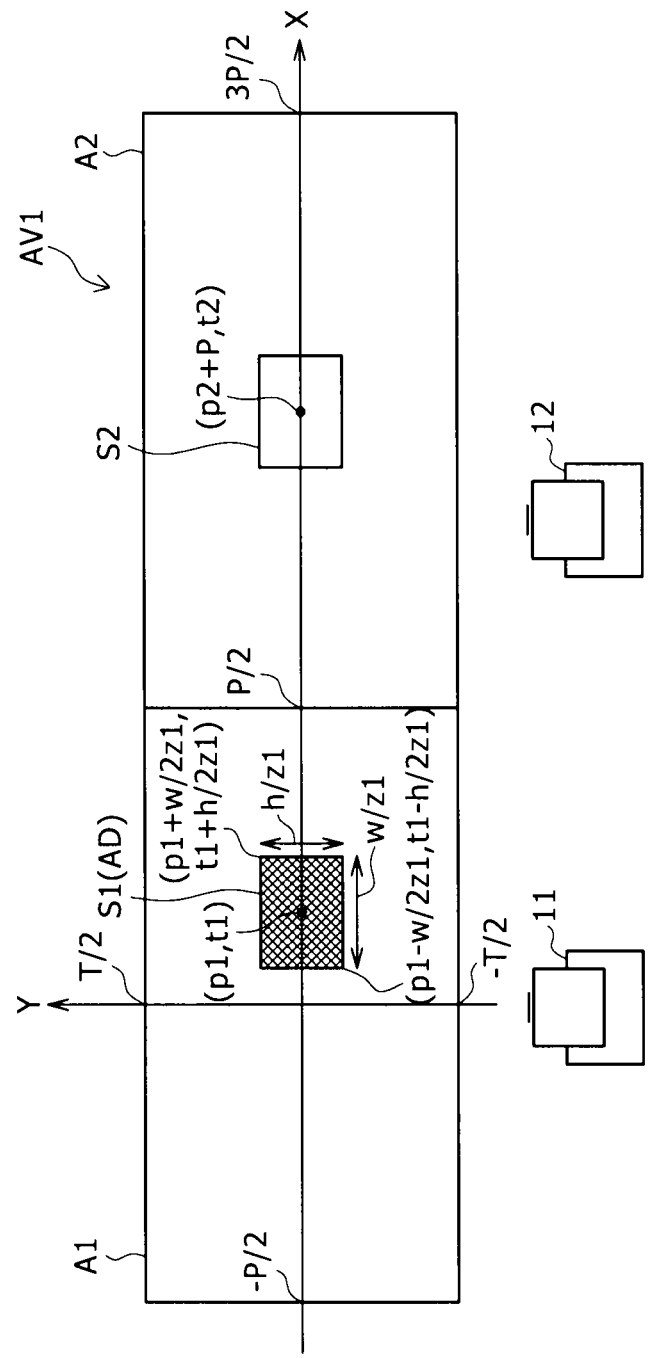
FIG. 5 is a diagram showing a virtual area according to a first embodiment.

FIG. 5 is a diagram showing a virtual area AV1 according to the first embodiment. As described earlier, a virtual area AV is an area obtained by combining the first area A1 serving as the pan/tilt range of the first camera 11 with the second area A2 serving as the pan/tilt range of the second camera 12 in the left-to-right direction by at least making the first area A1 and the second area A2 adjacent to each other. In particular, the virtual area AV1 according to the first embodiment is an area obtained by combining the first area A1 with the second area A2 serving as the pan/tilt range of the second camera 12 in the left-to-right direction by making the first area A1 and the second area A2 adjacent to each other.

FIG. 5 also shows a hatched first imaging area S1 serving as the display area AD which is the image-displaying subject. It is to be noted that, in the subsequent diagrams, the display area AD is shown as a hatched first imaging area S1 or a hatched second imaging area S2. The user is allowed to carry out an operation such as a drag operation or a push operation on an input device connected to the information acquisition section 51 in order to move the display area AD in the virtual area AV1. In addition, the user is also allowed to carry out an operation such as a tap operation or a push operation on an input device connected to the information acquisition section 51 in order to enlarge or contract the display area AD. The image displaying apparatus 50 displays an image of the first imaging area S1 or the second imaging area S2 in accordance with the position of the display area AD in the virtual area AV1. In the typical example shown in FIG. 5, the image displaying apparatus 50 displays a moving object O captured by the first imaging area S1 selected as the display area AD.

The position of the display area AD in the virtual area AV1 is expressed by the pan/tilt angles of the first camera 11 and the second camera 12 with the center of the first area A1 taken as a reference having coordinates $(X, Y)=(0, 0)$. As an example, the position of the display area AD on the left upper corner of the first area A1 is expressed by coordinates $(X, Y)=(-P/2, T/2)$ whereas the position of the display area AD on the right lower corner of the first area A1 is expressed by coordinates $(X, Y)=(P/2, -T/2)$. As another example, the position of the display area AD on the left upper corner of the second area A2 is expressed by coordinates $(X, Y)=(P/2, T/2)$ whereas the position of the display area AD on the right lower corner of the second area A2 is expressed by coordinates $(X, Y)=(3P/2, -T/2)$. That is to say, the display area AD positioned in the first area A1 is the first imaging area S1 and has coordinates $(X, Y)=(p1, t1)$ whereas the display area AD positioned in the second area A2 is the second imaging area S2 and has coordinates $(X, Y)=(p2+P, t2)$.

For zoom ratio z=1.0, the display area AD is an area having a reference width (or a reference pan angle) w and a reference height (or a reference tilt angle) h. Thus, the display area AD positioned in the first area A1 occupies a range of (p1−w/2z1, t1−h/2z1) to (p1+w/2z1, t1+h/2z1). By the same token, the display area AD positioned in the second area A2 occupies a range of (p2+P−w/2z2, t2−h/2z2) to (p2+P+w/2z2, t2+h/2z2). In addition, for example, a display area AD at the center of the right edge of the first area A1 and a display area AD at the center of the left edge of the second area A2 are located at the same position with coordinates (X, Y)=(P/2, 0). Therefore, for the zoom ratios satisfying the relation z1=z2, these display areas AD occupy the same range.

It is thus obvious from the above description that the position of the display area AD and the imaging conditions of the first camera 11 and the second camera 12 satisfy the following relations. In a movement made by the display area AD in a direction from the first area A1 to the second area A2, when the position of the display area AD is in a range of −P/2≤X<P/2, the first camera 11 is controlled but when the position of the display area AD is in a range of P/2≤X≤3P/2, the second camera 12 is controlled. In addition, in a movement made by the display area AD in a direction from the second area A2 to the first area A1, when the position of the display area AD is in a range of −P/2≤X≤P/2, the first camera 11 is controlled but when the position of the display area AD is in a range of P/2<X≤3P/2, the second camera 12 is controlled. On top of that, without regard to the direction of the movement of the display area AD, on the basis of the position of the display area AD, the first camera 11 is controlled under imaging conditions of p1=X and t1=Y whereas the second camera 12 is controlled under imaging conditions of p2=X−P and t2=Y as shown in the Table 1 given as follows.

TABLE 1

| Movement direction | Display-area position | Controlled camera | Imaging conditions |
|---|---|---|---|
| First → Second | −P/2 ≤ X < P/2 | First camera | p1 = X, t1 = Y |
|  | P/2 ≤ X ≤ 3P/2 | Second camera | p2 = X − P, t2 = Y |
| Second → First | −P/2 ≤ X ≤ P/2 | First camera | p1 = X, t1 = Y |
|  | P/2 < X ≤ 3P/2 | Second camera | p2 = X − P, t2 = Y |

Figure 6:
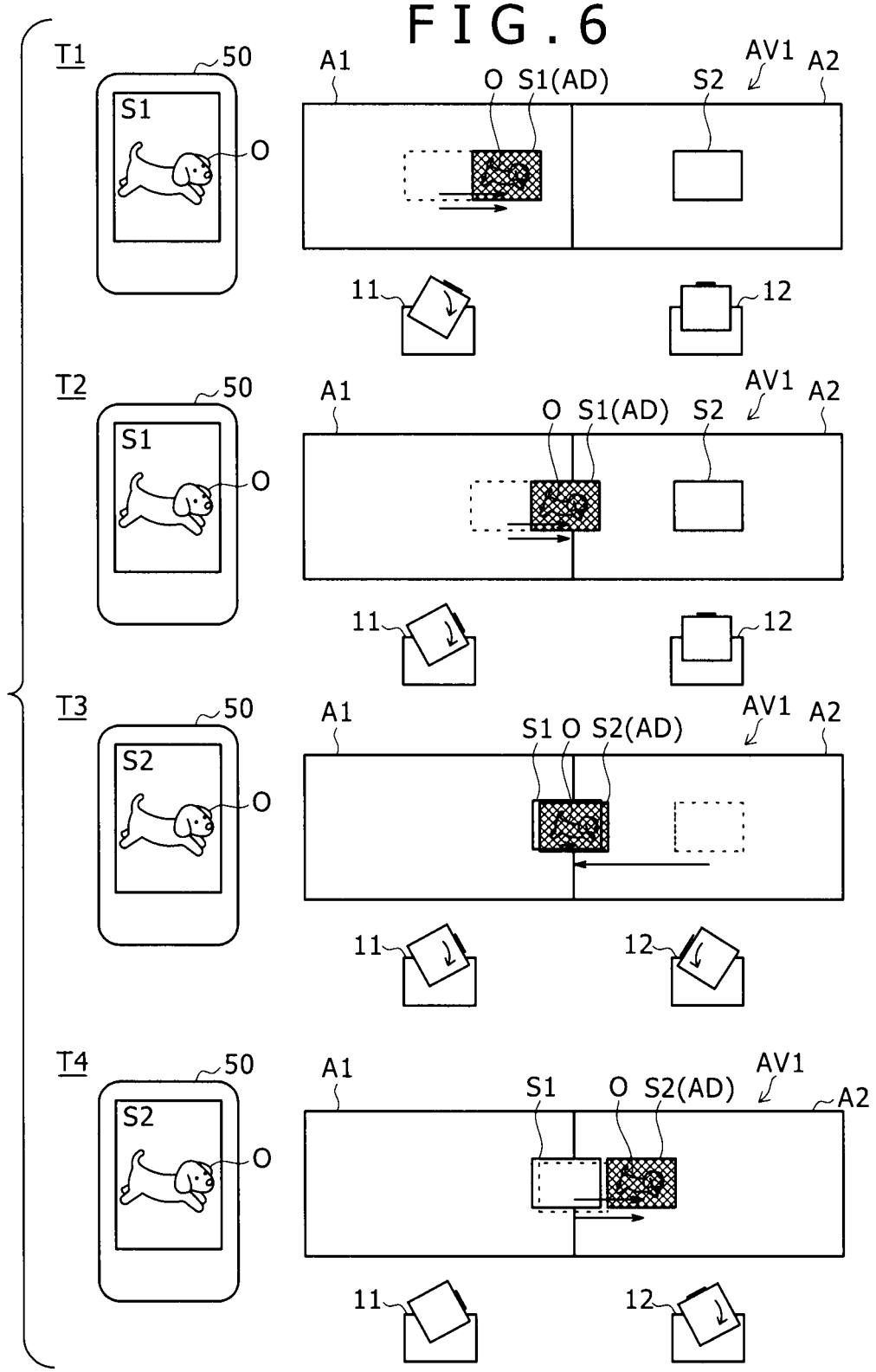
FIG. 6 is a diagram showing typical events taking place in an image displaying system according to the first embodiment.
Figure 7:
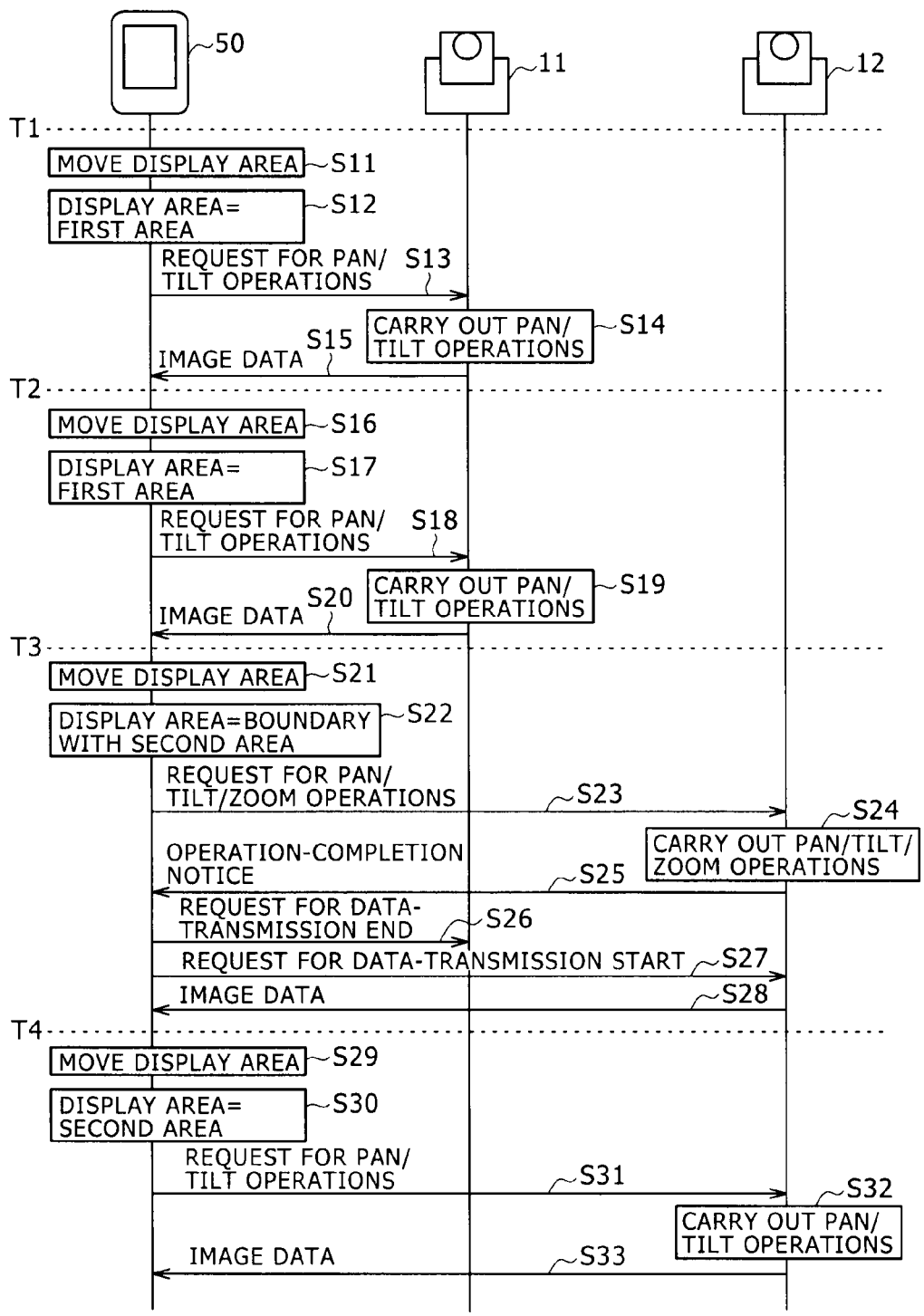
FIG. 7 is a diagram showing a sequence of operations carried out by the image displaying system for the events shown in FIG. 6.

FIGS. 6 and 7 are explanatory diagrams referred to in the following description of operations to capture a moving object O moving in a direction from the first area A1 to the second area A2 and display the image of the moving object O. To be more specific, FIG. 6 is a diagram showing typical events taking place in the image displaying system according to the first embodiment whereas FIG. 7 is a diagram showing a sequence of operations carried out by the image displaying system for the events shown in FIG. 6.

In the following description, the first imaging area S1 of the first camera 11 and the second imaging area S2 of the second camera 12 have been set in advance to satisfy imaging conditions including p1, p2=±0, t1, t2=±0 and z1, z2=1.0. In addition, the display area AD has been located initially at the center of the first area A1 or a position having coordinates (X, Y)=(0, 0).

When the user enters a command to start an operation to display an image, the control section 55 employed in the image displaying apparatus 50 determines the position of the display area AD. As described above, the display area AD has been located initially at the center of the first area A1 or a position having coordinates (X, Y)=(0, 0) in the virtual area AV1. Thus, the control section 55 determines that the position of the display area AD is in the first area A1. In this case, the control section 55 requests the first camera 11 to start an operation to transmit image data to the image displaying apparatus 50. At this request, the imaging section 21 employed in the first camera 11 images an imaging object in the first imaging area S1 whereas the communication section 23 transmits image data representing the image to the image displaying apparatus 50. In the image displaying apparatus 50, the communication section 54 receives the image data whereas the image displaying section 53 displays the image. Thus, the image displaying apparatus 50 displays the image of an imaging object in the first imaging area S1.

In a state T1 of the events shown in FIG. 6, a moving object O is moving in the left-to-right direction over the first area A1 toward the second area A2. At a step S11 of the operation sequence shown in FIG. 7, the user moves the display area AD in order to capture the moving object O. At a step S12, in the image displaying apparatus 50, the information acquisition section 51 acquires information used for moving the display area AD whereas the control section 55 determines the position of the display area AD on the basis of the acquired information. In the state T1, the display area AD is at a position in the first area A1. That is to say, the display area AD is at a position within a range of −P/2 X<P/2 in the virtual area AV1. In this case, the image of the display area AD is captured in the first imaging area S1 without regard to the zoom ratio z1. At a step S13, in the image displaying apparatus 50, the control section 55 requests the first camera 11 to carry out pan/tilt operations according to the movement of the display area AD. In order for the control section 55 to make such a request, the communication section 54 employed in the image displaying apparatus 50 transmits a control signal representing the request to the first camera 11. To put it in detail, the control section 55 transmits changes of the pan/tilt angles p1 and t1 to the first camera 11. The changes of the pan/tilt angles p1 and t1 represent the changes of coordinates (X, Y) of the position of the display area AD.

At a step S14, in the first camera 11, the communication section 23 receives the control signal transmitted by the image displaying apparatus 50 whereas the control section 25 controls the pan/tilt operations through the driving section 24. The imaging section 21 images the imaging object of the first imaging area S1 moved in accordance with the pan/tilt operations. At a step S15, the image displaying apparatus 50 receives the image data representing the image of the imaging object and displays the image of the moving object O captured in the first imaging area S1.

In a state T2, the moving object O has moved to a position in front of the boundary between the first area A1 and the second area A2. At a step S16, the user moves the display area AD in order to capture the moving object O. At a step S17, the control section 55 determines that the display area AD is at a position in the first area A1. That is to say, the display area AD is at a position within a range of −P/2≤X<P/2 in the virtual area AV1. At a step S18, the control section 55 requests the first camera 11 to carry out pan/tilt operations according to the movement of the display area AD. At a step S19, the first camera 11 carries out the pan/tilt operations and images the imaging object of the first imaging area S1 whereas, at a step S20, the image displaying apparatus 50 receives image data from the first camera 11, displaying an image of the moving object O captured in the first imaging area S1.

In a state T3, the moving object O has moved to the boundary between the first area A1 and the second area A2. At a step S21, the user moves the display area AD in order to capture the moving object O. At a step S22, the control section 55 determines that the display area AD is on the boundary between the first area A1 and the second area A2. That is to say, the display area AD is at a position having a coordinate X=P/2 in the virtual area AV1. In this case, the image of the display area AD is captured in the second imaging area S2 without regard to the zoom ratio z2. Since the image of the display area AD is captured in the second imaging area S2, the display area AD is switched automatically from the first imaging area S1 to the second imaging area S2. As a result, the image displaying apparatus 50 takes the second camera 12 as the subject of control in place of the first camera 11.

The display area AD is switched from the first imaging area S1 to the second imaging area S2 as follows. At a step S23, in the image displaying apparatus 50, the control section 55 requests the second camera 12 to carry out pan/tilt operations (and a zoom operation) according to the movement of the display area AD. In order for the control section 55 to make such a request, the communication section 54 employed in the image displaying apparatus 50 transmits a control signal representing the request to the second camera 12. To put it in detail, the control section 55 requests the second camera 12 to carry out pan/tilt operations (and a zoom operation) to make the following settings: p2=p1 and t2=p1 (and a zoom operation of z2=z1). At a step S24, in the second camera 12, the communication section 23 receives the control signal transmitted by the image displaying apparatus 50 whereas the control section 25 controls the pan/tilt operations (and the zoom operation) through the driving section 24. When the imaging section 21 recognizes a state in which an image of the imaging object in the second imaging area S2 moved in accordance with the pan/tilt operations can be taken, the control section 25 controls the communication section 23 to transmit an operation-completion notice to the image displaying apparatus 50 at a step S25. At this point of time, the image displaying apparatus 50 is displaying an image of the moving object O captured in the first imaging area S1.

When the image displaying apparatus 50 receives the operation-completion notice from the second camera 12, the control section 55 requests the first camera 11 to terminate the transmission of image data to the image displaying apparatus 50 at a step S26. In the first camera 11, the control section 25 controls the communication section 23 to terminate the transmission of image data to the image displaying apparatus 50. In addition, in the image displaying apparatus 50, the control section 55 requests the second camera 12 to start transmission of image data to the image displaying apparatus 50 at a step S27. In the second camera 12, the imaging section 21 images the imaging object in the second imaging area S2 whereas the communication section 23 transmits image data of the image to the image displaying apparatus 50 at a step S28. In the image displaying apparatus 50, the communication section 54 receives the image data from the second camera 12 whereas, on the basis of the image data, the image displaying section 53 displays the image of the moving object O captured in the second imaging area S2.

In a state T4, the moving object O is moving in the left-to-right direction over the second area A2. At a step S29, the user moves the display area AD in order to capture the moving object O. At a step S30, the control section 55 determines the position of the display area AD. In the state T4, the display area AD is at a position in the second area A2. That is to say, the display area AD is at a position within a range of P/2<X≤3P/2 in the virtual area AV1. Then, at a step S31, the control section 55 requests the second camera 12 to carry out pan/tilt operations according to the movement of the display area AD. At a step S32, the second camera 12 carries out the pan/tilt operations. At a step S33, the image displaying apparatus 50 receives image data representing an image of the imaging object from the second camera 12 and displays the image of the moving object O captured in the second imaging area S2.

In accordance with the first embodiment described above, in order to continuously capture the image of the moving object O, the user does not have to manually switch the subject of control between the first camera 11 and the second camera 12 and does not have to manually request the first camera 11 or the second camera 12 to carry out pan/tilt operations and, if necessary, a zoom operation after the subject of control has been switched between the first camera 11 and the second camera 12. Thus, the display area AD can be switched smoothly between the first imaging area S1 and the second imaging area S2. In addition, after the display area AD has been switched between the first imaging area S1 and the second imaging area S2, it is necessary to process the image of only an imaging area selected from the first imaging area S1 and the second imaging area S2 as an imaging area corresponding to the display area AD. Thus, the amount of data to be processed can be reduced. As described above, the display area AD is switched from the first imaging area S1 to the second imaging area S2 in the state T3. It is to be noted, however, that the display area AD can also be switched at a time between the states T3 and T4. That is to say, the display area AD can also be switched at a time right after the display area AD has crossed the boundary between the first area A1 and the second area A2.

[4: Image Displaying System According to Second Embodiment]

Next, by referring to FIGS. 8 to 11, the following description explains operations carried out in the image displaying system according to a second embodiment. In the case of the second embodiment, the display area AD is switched between the first imaging area S1 and the second imaging area S2 in a virtual area AV2 obtained by partially superposing the first area A1 on the second area A2. Explanations common to the first and second embodiments are eliminated from the following descriptions.

Figure 8:
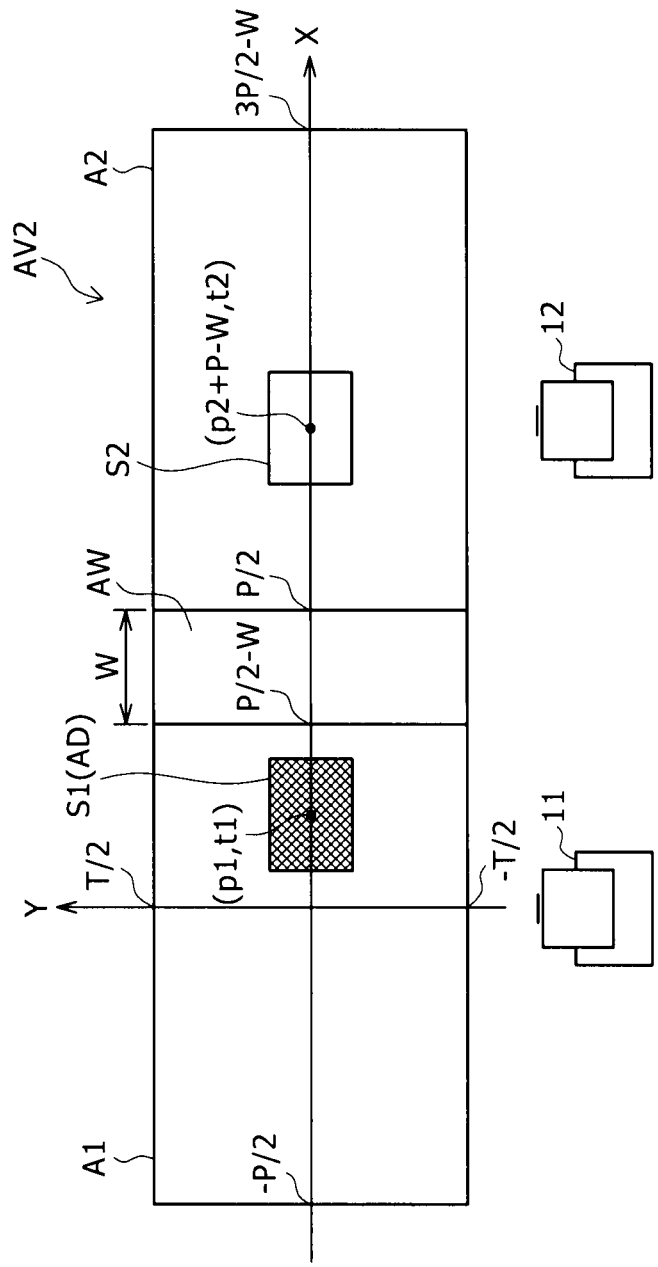
FIG. 8 is a diagram showing a virtual area according to a second embodiment.

FIG. 8 is a diagram showing a virtual area AV2 according to the second embodiment. As shown in the figure, the virtual area AV2 is a combined area obtained by aligning the first area A1 and the second area A2 in the left-to-right direction and by partially superposing the first area A1 and the second area A2 on each other. The first area A1 is partially superposed on the second area A2 to form a portion having a predetermined width W (or a predetermined pan-angle range). In the following description, the common area having the width W is also referred to as an overlap area AW.

Depending on the position of the display area AD in the virtual area AV2, the image displaying apparatus 50 displays an image of an object in the first imaging area S1 or the second imaging area S2. In the typical example shown in FIG. 8, the image displaying apparatus 50 displays an image of a moving object O captured in the first imaging area S1 selected as the display area AD.

The position of the display area AD in the virtual area AV2 is expressed by the pan/tilt angles of the first camera 11 and the second camera 12 with the center of the first area A1 taken as a reference having coordinates (X, Y)=(0, 0). As an example, the position of the display area AD on the left upper corner of the first area A1 is expressed by coordinates (X, Y)=(−P/2, T/2) whereas the position of the display area AD on the right lower corner of the first area A1 is expressed by coordinates (X,Y)=(P/2, −T/2). As another example, the position of the display area AD on the left upper corner of the second area A2 is expressed by coordinates (X, Y)=(P/2−W, T/2) whereas the position of the display area AD on the right lower corner of the second area A2 is expressed by coordinates (X, Y)=(3P/2−W, −T/2). That is to say, the display area AD positioned in the first area A1 is the first imaging area S1 and has coordinates (X, Y)=(p1, t1) whereas the display area AD positioned in the second area A2 is the second imaging area S2 and has coordinates (X, Y)=(p2+P−W, t2).

For zoom ratio z=1.0, the display area AD is an area having a reference width (or a reference pan angle) w and a reference height (or a reference tilt angle) h. Thus, the display area AD positioned in the first area A1 occupies a range of (p1−w/2z1, t1−h/2z1) to (p1+w/2z1, t1+h/2z1). By the same token, the display area AD positioned in the second area A2 occupies a range of (p2+P−W−w/2z2, t2−h/2z2) to (p2+P−W+w/2z2, t2+h/2z2). In addition, for example, a display area AD at the center of the overlap area AW has coordinates (X, Y)=(P/2−W/2, 0).

It is thus obvious from the above description that the position of the display area AD and the imaging conditions of the first camera 11 and the second camera 12 satisfy the following relations. In a movement made by the display area AD in a direction from the first area A1 to the second area A2, when the position of the display area AD is in a range of −P/2 X<(P/2−W), the first camera 11 is controlled but when the position of the display area AD is in a range of (P/2−W) X (3P/2−W), the second camera 12 is controlled. In addition, in a movement made by the display area AD in a direction from the second area A2 to the first area A1, when the position of the display area AD is in a range of −P/2≤X≤P/2, the first camera 11 is controlled but when the position of the display area AD is in a range of P/2<X≤(3P/2−W), the second camera 12 is controlled. On top of that, without regard to the direction of the movement of the display area AD, on the basis of the position of the display area AD, the first camera 11 is controlled under imaging conditions of p1=X and t1=Y whereas the second camera 12 is controlled under imaging conditions of p2=X−P+W and t2=Y as shown in the Table 2 given as follows.

TABLE 2

| Movement direction | Display-area position | Controlled camera | Imaging conditions |
| --- | --- | --- | --- |
| First → Second | −P/2 ≤ X < P/2 − W | First camera | p1 = X, t1 = Y |
|  | P/2 − W ≤ X ≤ 3P/2 − W | Second camera | p2 = X − P + W, t2 = Y |
| Second → First | −P/2 ≤ X ≤ P/2 | First camera | p1 = X, t1 = Y |
|  | P/2 < X ≤ 3P/2 − W | Second camera | p2 = X − P + W, t2 = Y |

Figure 9:
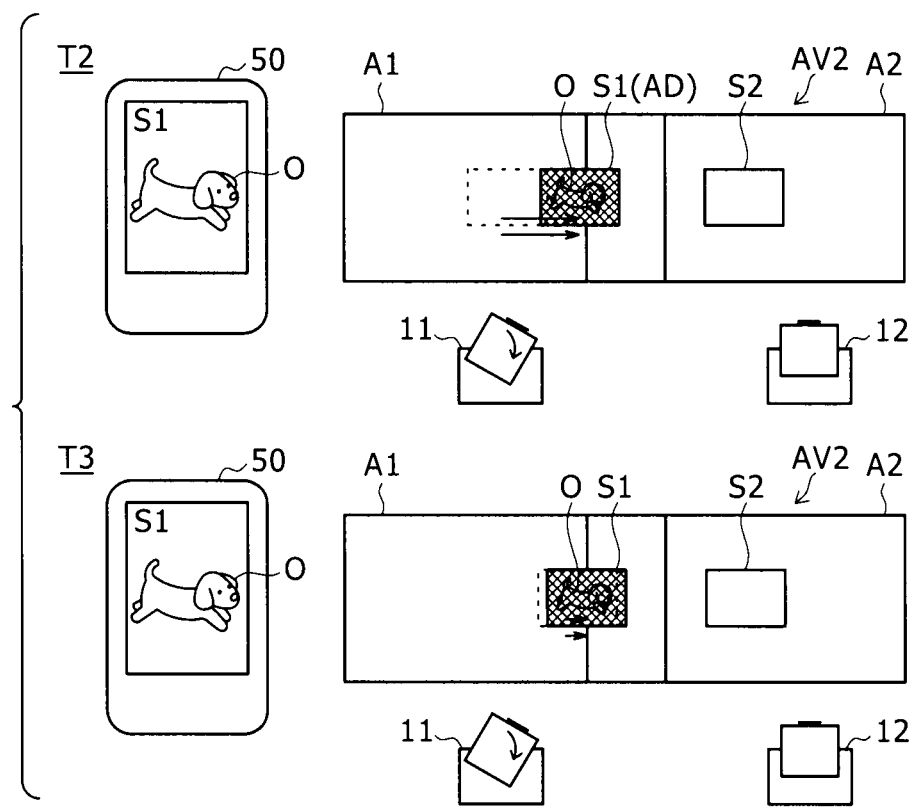
FIG. 9 is a first diagram (1/2) showing typical events taking place in an image displaying system according to the second embodiment.
Figure 10:
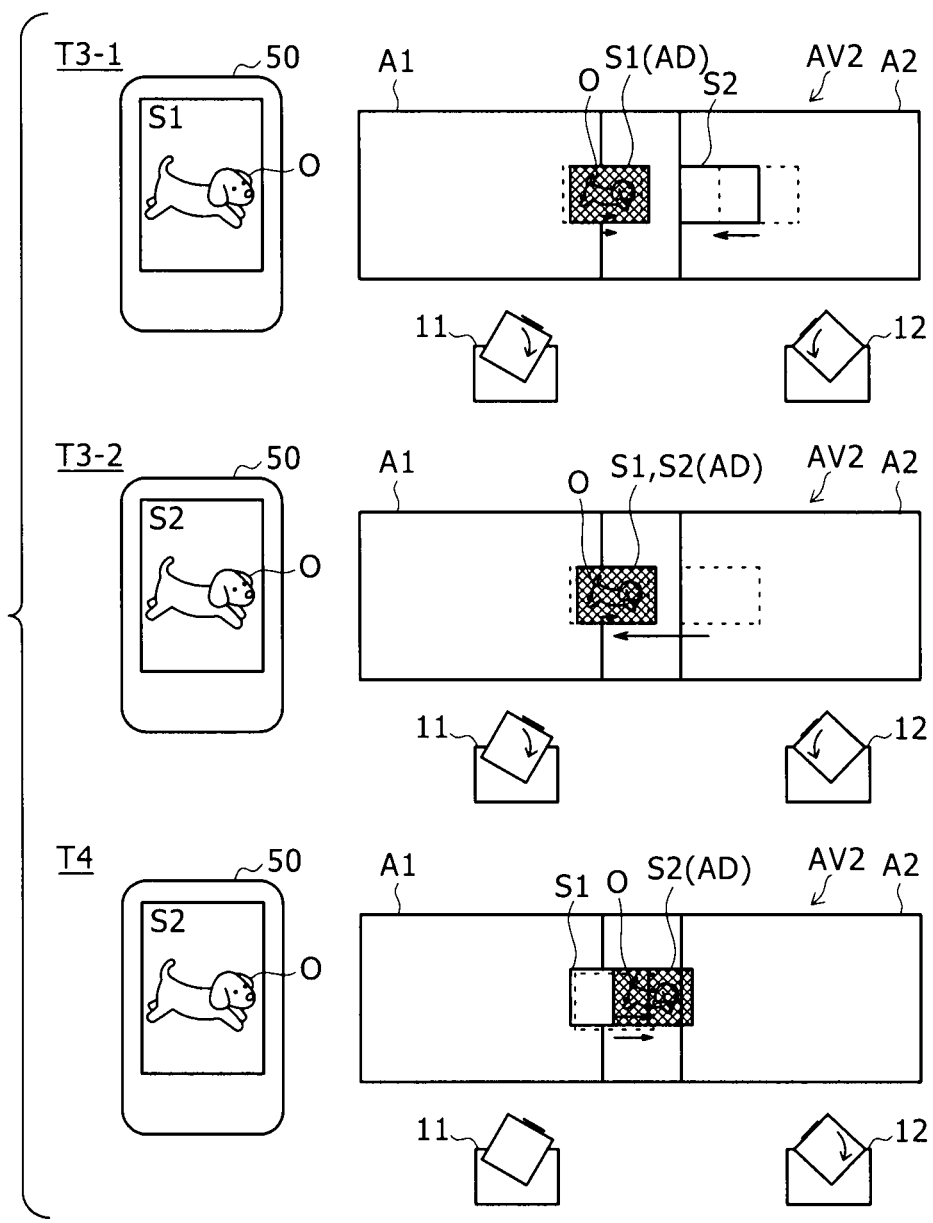
FIG. 10 is a second diagram (2/2) showing typical events taking place in the image displaying system according to the second embodiment.
Figure 11:
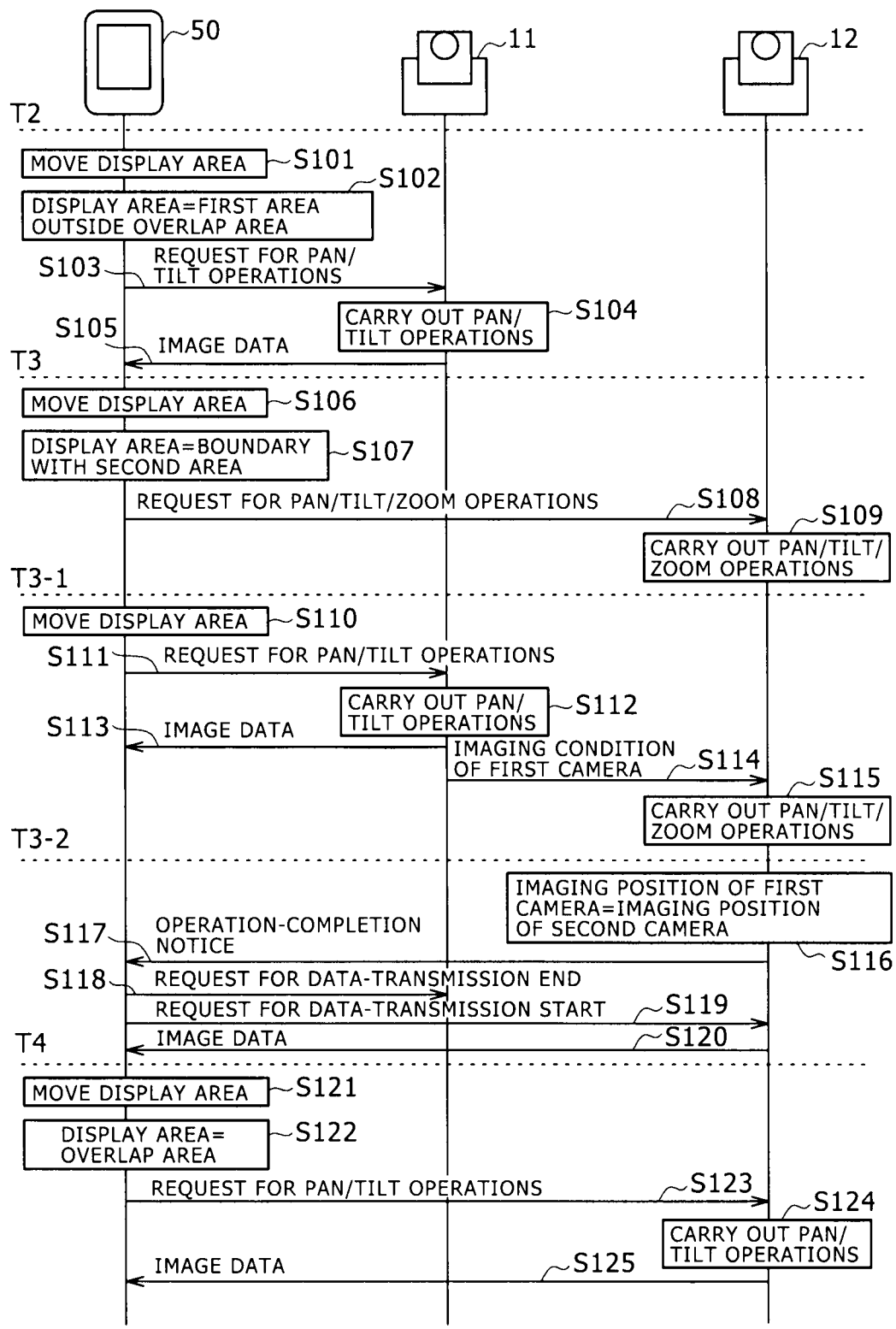
FIG. 11 is a diagram showing a sequence of operations carried out by the image displaying system for the events shown in FIGS. 9 and 10.

FIGS. 9 to 11 are explanatory diagrams referred to in the following description of operations to capture a moving object O moving in a direction from the first area A1 to the second area A2 and display the image of the moving object O. To be more specific, FIGS. 9 and 10 are diagrams showing typical events taking place in the image displaying system according to the second embodiment. On the other hand, FIG. 11 is a diagram showing a sequence of operations carried out by the image displaying system according to the second embodiment for the events shown in FIGS. 9 and 10.

In a state T2 of the events shown in FIG. 9, the moving object O has moved to a position in front of the overlap area AW. At a step S101 of the operation sequence shown in FIG. 11, the user moves the display area AD in order to capture the moving object O. At a step S102, the control section 55 determines that the display area AD is at a position in the first area A1 outside the overlap area AW. That is to say, the display area AD is at a position within a range of −P/2 X<(P/2−W) in the virtual area AV2. At a step S103, the control section 55 requests the first camera 11 to carry out pan/tilt operations according to the movement of the display area AD. At a step S104, the first camera 11 carries out the pan/tilt operations and images the imaging object of the first imaging area S1. At a step S105, the image displaying apparatus 50 receives image data from the first camera 11 and displays an image of the moving object O captured in the first imaging area S1.

In a state T3, the moving object O has moved to the boundary between the first area A1 and the second area A2. At a step S106, the user moves the display area AD in order to capture the moving object O. At a step S107, the control section 55 determines that the display area AD is on the boundary between the first area A1 and the second area A2. That is to say, the display area AD is at a position having a coordinate X=P/2−W in the virtual area AV2. In this case, the image displaying apparatus 50 requests the second camera 12 to carry out pan/tilt operations and a zoom operation in accordance with the movement of the display area AD due to the movement of the moving object O at a step S108. The second camera 12 then starts the pan/tilt operations and the zoom operation at a step S109.

In a state T3-1 shown in FIG. 10, the user moves the display area AD in order to follow the moving object O at a step S110. In this case, the display area AD is at a position within a range of (P/2−W)<X<P/2 in the virtual area AV2. The image displaying apparatus 50 requests the first camera 11 to carry out pan/tilt operations according to the movement of the display area AD at a step S111. The first camera 11 carries out the pan/tilt operations to move the first imaging area S1 in the left-to-right direction to cross the boundary between the first area A1 and the second area A2 at a step S112. Then, the first camera 11 images an imaging object of the first imaging area S1 and transmits image data of the image to the image displaying apparatus 50 whereas the image displaying apparatus 50 displays the image of the moving object O captured in the first imaging area S1 at a step S113. Subsequently, the first camera 11 transmits changes of imaging conditions to the second camera 12 at a step S114.

In the meantime, the second camera 12 is carrying out pan/tilt operations to switch the display area AD from the first imaging area S1 to the second imaging area S2. To be more specific, the second camera 12 is moving the second imaging area S2 in the right-to-left direction in order to make the position of the second imaging area S2 coincident with the position of the first imaging area S1 at a step S115. In this case, the image of the display area AD positioned in the overlap area AW can be captured in the first imaging area S1 or the second imaging area S2 without regard to the zoom ratios z1 and z2.

In a state T3-2, the position of the second imaging area S2 coincides with the position of the first imaging area S1 at a step S116. The second camera 12 compares the imaging conditions of the first camera 11 with the imaging conditions of the second camera 12 in order to confirm the coincidence of the first imaging area S1 and the second imaging area S2. In this way, the image of the moving object O is captured in the first imaging area S1 and the second imaging area S2. With the image of the moving object O captured in the first imaging area S1 and the second imaging area S2, the second camera 12 transmits an operation-completion notice to the image displaying apparatus 50 at a step S117. When the image displaying apparatus 50 receives the operation-completion notice from the second camera 12, the control section 55 requests the first camera 11 to terminate the transmission of image data at a step S118. Later on, in the image displaying apparatus 50, the control section 55 requests the second camera 12 to start transmission of image data at a step S119. In the second camera 12, the imaging section 21 images the imaging object in the second imaging area S2 moved in accordance with the pan/tilt operations and the zoom operation whereas the communication section 23 transmits image data of the image to the image displaying apparatus 50 at a step S120. At the same step, in the image displaying apparatus 50, the communication section 54 receives the image data from the second camera 12 whereas, on the basis of the image data, the image displaying section 53 displays the image of the moving object O captured in the second imaging area S2.

In a state T4, the moving object O is moving over the overlap area AW. At a step S121, the user moves the display area AD in order to capture the moving object O. At a step S122, the image displaying apparatus 50 determines the position of the display area AD. In the state T4, the display area AD is at a position in the overlap area AW. That is to say, the display area AD is at a position within a range of $(P/2-W) \leq X < 3P/2$ in the virtual area AV2. Then, at a step S123, the image displaying apparatus 50 requests the second camera 12 to carry out pan/tilt operations according to the movement of the display area AD. At a step S124, the second camera 12 carries out the pan/tilt operations and images the moving object O captured in the second imaging area 2. At a step S125, the image displaying apparatus 50 receives image data representing an image of an imaging object from the second camera 12 and displays the image of the moving object O captured in the second imaging area S2.

In accordance with the second embodiment, when the display area AD moves to at least the boundary between the first area A1 and the second area A2, the display area AD is switched from the first imaging area S1 to the second imaging area S2. In this case, the image of the display area AD positioned in the overlap area AW can be captured in the first imaging area S1 or the second imaging area S2. Thus, while the display area AD is moving through the overlap area AW, the image generated from the first imaging area S1 or the second imaging area S2 for the display area AD prior to the operation carried out to switch the display area AD from the first imaging area S1 to the second imaging area S2 in order to follow the movement of the display area AD can be displayed till the preparation of the operation to switch the display area AD from the first imaging area S1 to the second imaging area S2 has been completed. Accordingly, even if it takes time to switch the display area AD from the first imaging area S1 to the second imaging area S2, the display area AD can be smoothly switched from the first imaging area S1 to the second imaging area S2. As described above, the display area AD is switched from the first imaging area S1 to the second imaging area S2 in the state T3. It is to be noted, however, that the display area AD can also be switched at a time between the states T3 and T4. That is to say, the display area AD can also be switched at a time right after the display area AD is positioned in the overlap area AW after crossing the boundary between the first area A1 and the second area A2.

[5: Image Displaying System According to Third Embodiment]

Figure 12:
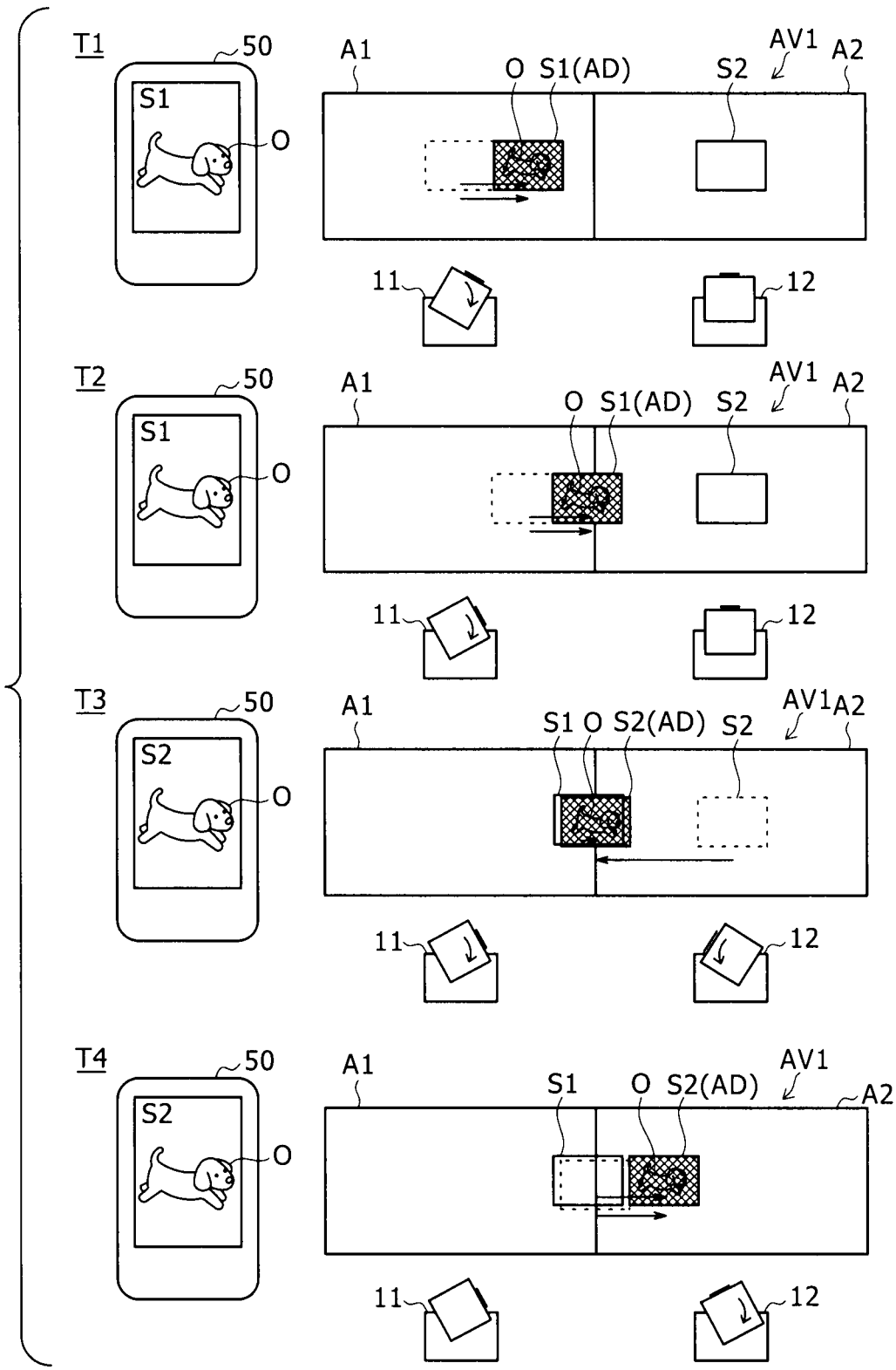
FIG. 12 is a diagram showing typical events taking place in an image displaying system according to a third embodiment.
Figure 13:
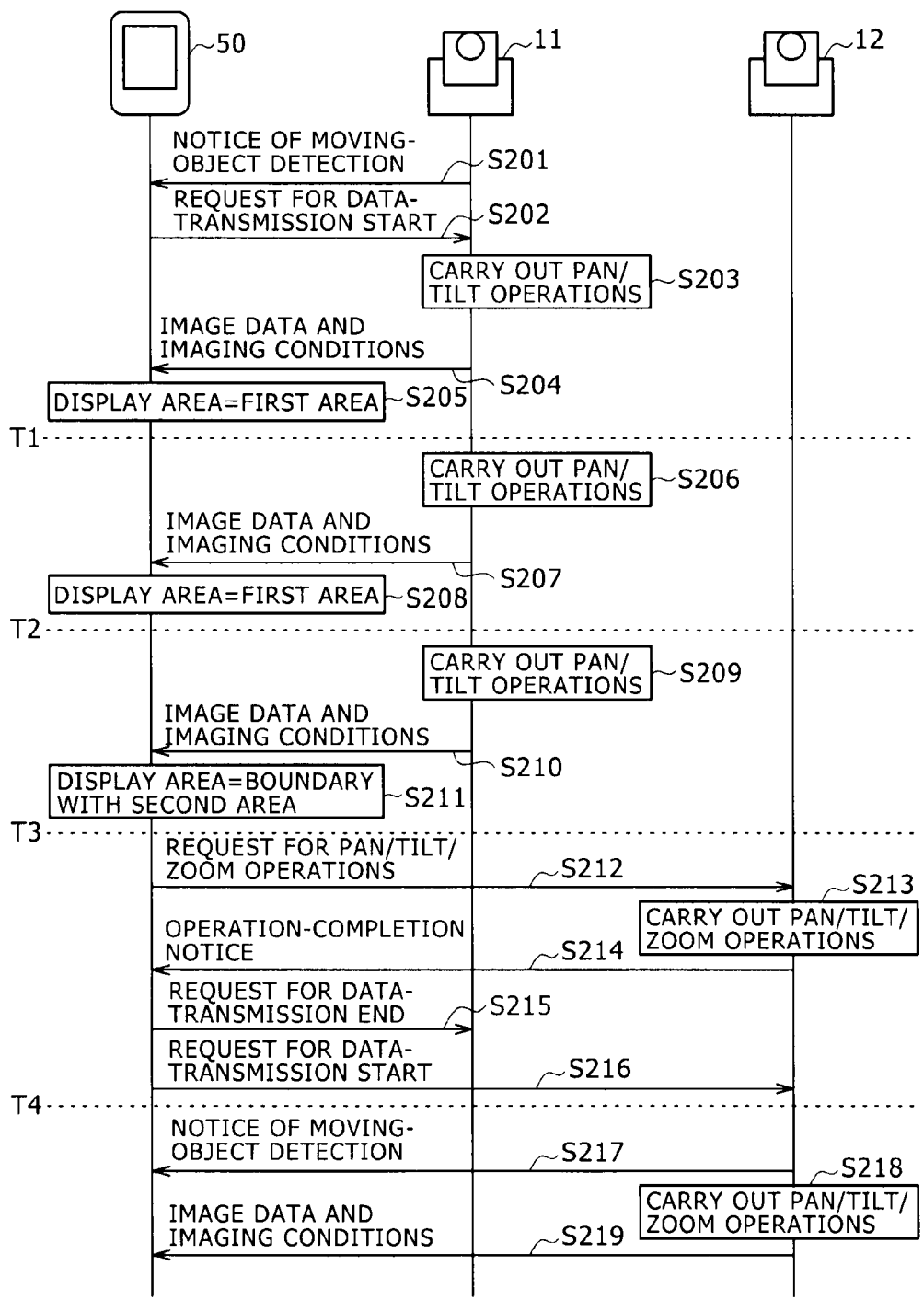
FIG. 13 is a diagram showing a sequence of operations carried out by the image displaying system for the events shown in FIG. 12.

Next, by referring to FIGS. 12 and 13, the following description explains operations carried out in the image displaying system according to a third embodiment. In the case of the third embodiment, the display area AD is moved to follow the movement of the moving object O on the basis of object detection information acquired from the first camera 11 and the second camera 12 instead of carrying out pan/tilt operations in accordance with an operation carried out by the user.

FIGS. 12 and 13 are explanatory diagrams referred to in the following description of operations to capture a moving object O moving in a direction from the first area A1 to the second area A2 and display the image of the moving object O. Hereunder the case in which the virtual area AV1 according to the first embodiment is utilized is described. To be more specific, FIG. 12 is a diagram showing typical events taking place in the image displaying system according to the third embodiment whereas FIG. 13 is a diagram showing a sequence of operations carried out by the image displaying system for the events shown in FIG. 12.

First of all, the first camera 11 detects a moving object O moving over the first area A1. For example, the first camera 11 minimizes the zoom ratio z1 and carries out pan/tilt operations in order to move the first imaging area S1 throughout the first area A1. The first camera 11 images an imaging object in the first imaging area S1 moved in accordance with the pan/tilt operations and generates image data from an imaging signal representing the image. The first camera 11 compares image data taken in a present cycle for the first imaging area S1 at a position with image data taken in a previous cycle for the first imaging area S1 at the same position in order to infer the state of a movement made by an imaging object. The first camera 11 detects a moving object O whose image is to be displayed due to attributes of the imaging object. The attributes typically include the size of the imaging object and the moving velocity of the object. By the same token, the second camera 12 also detects a moving object O moving over the second area A2. It is to be noted that, if the first camera 11 detects a moving object O moving over the first area A1 and the second camera 12 also detects a moving object O moving over the second area A2, the moving object O detected by the first camera 11 or the second camera 12 can be selected as an object whose image is to be displayed.

In the following description, it is assumed that a moving object O in the first area A1 has been detected. In this case, at a step S201 of the operation sequence shown in FIG. 13, the first camera 11 notifies the image displaying apparatus 50 that the moving object O has been detected. Informed by the first camera 11 that the moving object O has been detected, the image displaying apparatus 50 requests the first camera 11 to start transmission of image data of the captured moving object O at a step S202.

In a state T1 of the events shown in FIG. 12, the moving object O is moving in a direction from the first area A1 to the second area A2. At a step S203, the first camera 11 carries out pan/tilt operations in order to capture the moving object O in the first imaging area S1. Then, at a step S204, the first camera 11 images an imaging object of the first imaging area S1 and transmits image data as well as imaging conditions p1, t1 and z1 to the image displaying apparatus 50. At a step S205, the image displaying apparatus 50 determines that the display area AD is positioned in the first area A1 on the basis of the imaging conditions received from the first camera 11. In this case, the control section 55 identifies the position of the display area AD in the virtual area AV1 on the basis of changes of the coordinates (X, Y) of the display area AD. The changes of the coordinates (X, Y) of the display area AD can be found from changes of the imaging conditions.

In a state T2, the moving object O has reached a position in front of the boundary between the first area A1 and the second area A2. At a step S206, the first camera 11 carries out pan/tilt operations in order to capture the moving object O in the first imaging area S1. Then, at a step S207, the first camera 11 images the imaging object of the first imaging area S1 and transmits image data as well as imaging conditions to the image displaying apparatus 50. At a step S208, the image displaying apparatus 50 determines that the display area AD is positioned in the first area A1 on the basis of the imaging conditions received from the first camera 11.

In a state T3, the moving object O has reached the boundary between the first area A1 and the second area A2. At a step S209, the first camera 11 moves the first imaging area S1 to the right edge of the first area A1. Then, at a step S210, the first camera 11 images the imaging object of the first imaging area S1 and transmits image data as well as imaging conditions to the image displaying apparatus 50. At a step S211, the image displaying apparatus 50 determines that the display area AD is positioned on the boundary between the first area A1 and the second area A2 on the basis of the imaging conditions received from the first camera 11. Determining that the display area AD is positioned on the boundary, the image displaying apparatus 50 automatically switches the display area AD from the first imaging area S1 to the second imaging area S2 and changes the subject of control from the first camera 11 to the second camera 12 as follows.

To put it concretely, at a step S212, the image displaying apparatus 50 requests the second camera 12 to carry out pan/tilt operations and, if necessary, a zoom operation in accordance with the movement of the display area AD due to the movement of the moving object O. To be more specific, the image displaying apparatus 50 requests the second camera 12 to carry out pan/tilt operations to make the following settings: p2=p1 and t2=p1 and, if necessary, a zoom operation to make the following setting: z2=z1. The second camera 12 carries out the pan/tilt operations and, if necessary, the zoom operation in accordance with the movement of the display area AD at a step S213. When the second camera 12 recognizes a state in which an image of the imaging object in the second imaging area S2 moved in accordance with the pan/tilt operations can be taken, the second camera 12 transmits an operation-completion notice to the image displaying apparatus 50 at a step S214. Receiving the operation-completion notice from the second camera 12, the image displaying apparatus 50 requests the first camera 11 to end the transmission of image data at a step S215 and requests the second camera 12 to start transmission of image data as well as detection of the moving object O at a step S216. The image displaying apparatus 50 displays the image of the moving object O of the second imaging area S2.

In a state T4, the moving object O is moving over the second area A2 in a direction to the right edge. Then, when the second camera 12 detects the moving object O in the second imaging area S2, the second camera 12 transmits a notice of the detection of the moving object O to the image displaying apparatus 50 at a step S217. As is the case with the first camera 11, the second camera 12 moves the second imaging area S2 to follow the movement of the moving object O at a step S218. The second camera 12 transmits data of an image of the imaging object captured in the second imaging area S2 and imaging conditions to the image displaying apparatus 50 at a step S219. The image displaying apparatus 50 displays the image of the imaging object of the second imaging area S2.

In accordance with the third embodiment described above, the image displaying apparatus 50 is capable of smoothly switching the display area AD between the first imaging area S1 and the second imaging area S2 to follow a movement of the moving object O on the basis object detection information acquired by the image displaying apparatus 50 from the first camera 11 or the second camera 12. As described above, an image following a movement of the moving object O in the virtual area AV1 according to the first embodiment is displayed. It is to be noted, however, that an image following a movement of the moving object O in the virtual area AV2 according to the second embodiment can also be displayed.

[6: Modifications of the Image Displaying System]

Figure 14:
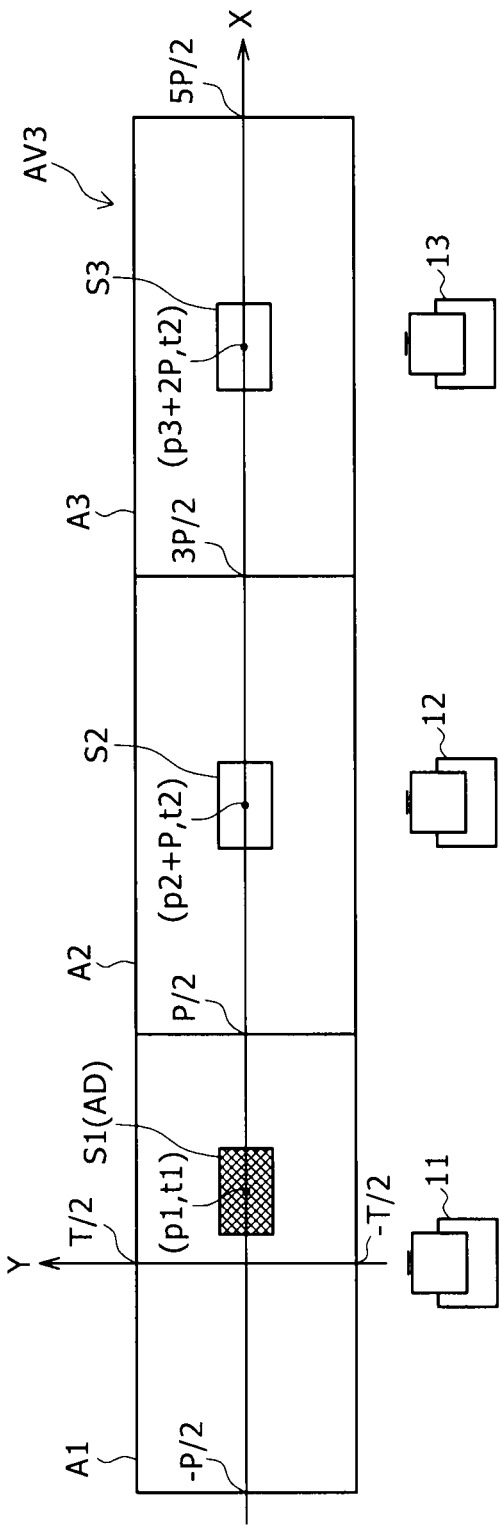
FIG. 14 is a first diagram (1/2) showing another example of the virtual area.

In addition, in the image displaying systems according to the first to third embodiments, the first camera 11 and the second camera 12 are aligned in the left-to-right direction. As shown in FIG. 14, however, an image displaying system may also have a configuration including a first camera 11, a second camera 12 and a third camera 13 which are aligned in the left-to-right direction. In such a configuration, the display area AD is switched among the first imaging area S1, the second imaging area S2 and the third imaging area S3 of the third camera 13 in accordance with the position of the display area AD in a virtual area AV3 obtained by combining the first area A1, the second area A2 and the third area A3 of the third camera 13 as shown in FIG. 14. In this way, it is possible to implement an image displaying system having a bigger size of the virtual area AV3 with a broader pan-angle range. The this configuration has typical relations shown in Table 3 given below as relations between the position of the display area AD and the imaging conditions of the first camera 11, the second camera 12 and the third camera 13 in the first embodiment.

TABLE 3

| Movement direction | Display-area position | Controlled camera | Imaging conditions |
| --- | --- | --- | --- |
| First → Second | $-P/2 \leq X < P/2$ | First camera | $p1 = X, t1 = Y$ |
|  | $P/2 \leq X \leq 3P/2$ | Second camera | $p2 = X - P, t2 = Y$ |
| Second → First | $-P/2 \leq X \leq P/2$ | First camera | $p1 = X, t1 = Y$ |
|  | $P/2 < X \leq 3P/2$ | Second camera | $p2 = X - P, t2 = Y$ |
| Second → Third | $P/2 \leq X < 3P/2$ | Second camera | $p2 = X - P, t2 = Y$ |
|  | $3P/2 \leq X \leq 5P/2$ | Third camera | $p3 = X - 2P, t3 = Y$ |
| Third → Second | $P/2 \leq X \leq 3P/2$ | Second camera | $p2 = X - P, t2 = Y$ |
|  | $3P/2 < X \leq 5P/2$ | Third camera | $p3 = X - 2P, t3 = Y$ |

Figure 15:
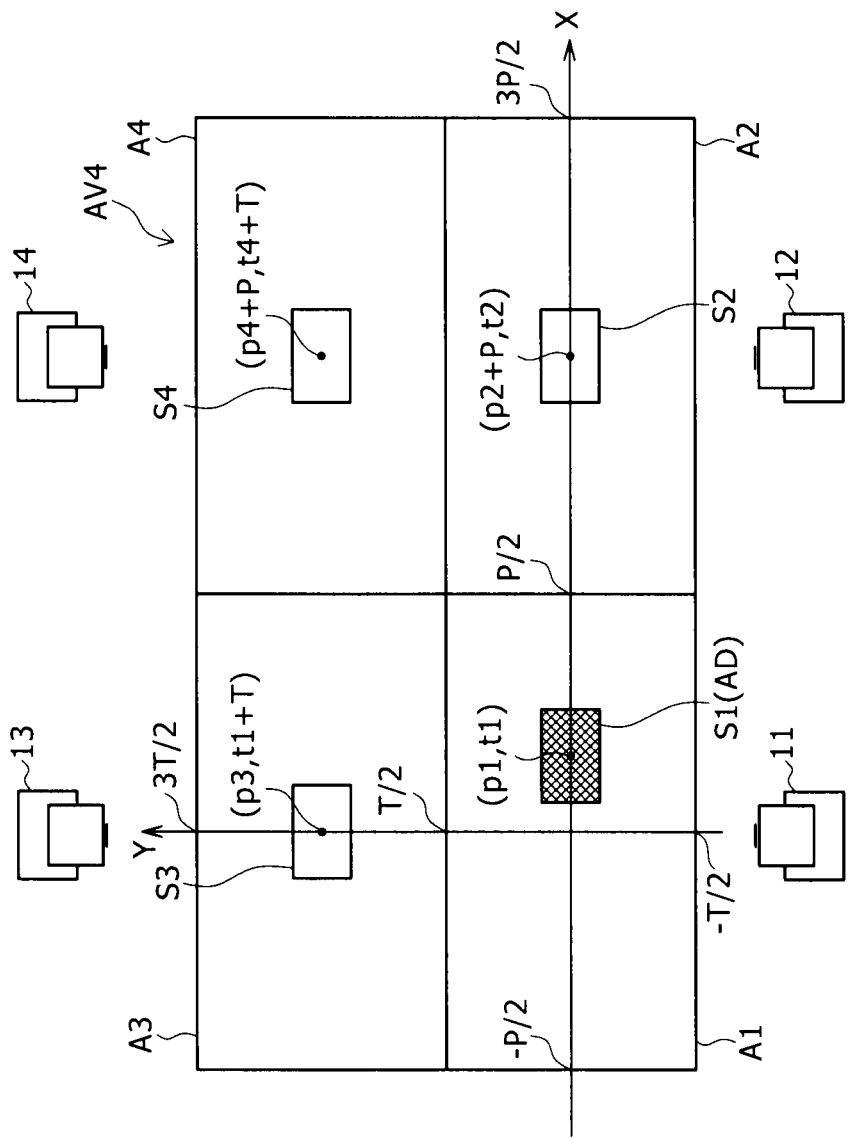
FIG. 15 is a second diagram (2/2) showing a further example of the virtual area.

In addition, as shown in FIG. 15, an image displaying system may also have a configuration including a first camera 11, a second camera 12, a third camera 13 and a fourth camera 14 which are aligned in the horizontal and vertical directions. In such a configuration, the display area AD is switched among the first imaging area S1, the second imaging area S2, third imaging area S3 and the fourth imaging area S4 of the fourth camera 14 in accordance with the position of the display area AD in a virtual area AV4 obtained by combining the first area A1, the second area A2, the third area A3 and the fourth area A4 of the fourth camera 14 as shown in FIG. 15. In this way, it is possible to implement an image displaying system having a bigger size of the virtual area AV4 with a broader pan/tilt range. This configuration has typical relations shown in Table 4 given below as relations between the position of the display area AD and the imaging conditions of the first camera 11, the second camera 12, the third camera 13 and the fourth camera 14 in the first embodiment.

TABLE 4

| Movement direction | Display-area position | Controlled camera | Imaging conditions |
|---|---|---|---|
| First → Second | $-P/2 \leq X < P/2$ | First camera | $p1 = X$ |
| | $-T/2 \leq Y < T/2$ | | $t1 = Y$ |
| | $P/2 \leq X \leq 3P/2$ | Second camera | $p2 = X - P$ |
| | $-T/2 \leq Y < T/2$ | | $t2 = Y$ |
| Second → First | $-P/2 \leq X \leq P/2$ | First camera | $p1 = X$ |
| | $-T/2 \leq Y < T/2$ | | $t1 = Y$ |
| | $P/2 < X \leq 3P/2$ | Second camera | $p2 = X - P$ |
| | $-T/2 \leq Y < T/2$ | | $t2 = Y$ |
| Third → Fourth | $-P/2 \leq X < P/2$ | Third camera | $p3 = X$ |
| | $T/2 \leq Y \leq 3T/2$ | | $t3 = Y - T$ |
| | $P/2 \leq X \leq 3P/2$ | Fourth camera | $p4 = X - P$ |
| | $T/2 \leq Y \leq 3T/2$ | | $t4 = Y - T$ |
| Fourth → Third | $-P/2 \leq X \leq P/2$ | Third camera | $p3 = X$ |
| | $T/2 \leq Y \leq 3T/2$ | | $t3 = Y - T$ |
| | $P/2 < X \leq 3P/2$ | Fourth camera | $p4 = X - P$ |
| | $T/2 \leq Y \leq 3T/2$ | | $t4 = Y - T$ |
| First → Third | $-P/2 \leq X < P/2$ | First camera | $p1 = X$ |
| | $-T/2 \leq Y < T/2$ | | $t1 = Y$ |
| | $-P/2 \leq X < P/2$ | Third camera | $p3 = X$ |
| | $T/2 \leq Y \leq 3T/2$ | | $t3 = Y - T$ |
| Third → First | $-P/2 \leq X < P/2$ | First camera | $p1 = X$ |
| | $-T/2 \leq Y \leq T/2$ | | $t1 = Y$ |
| | $-P/2 \leq X < P/2$ | Third camera | $p3 = X$ |
| | $T/2 < Y \leq 3T/2$ | | $t3 = Y - T$ |
| Second → Fourth | $P/2 \leq X \leq 3P/2$ | Second camera | $p2 = X - P$ |
| | $-T/2 \leq Y < T/2$ | | $t2 = Y$ |
| | $P/2 \leq X \leq 3P/2$ | Fourth camera | $p4 = X - P$ |
| | $T/2 \leq Y \leq 3T/2$ | | $t4 = Y - T$ |
| Fourth → Second | $P/2 \leq X \leq 3P/2$ | Second camera | $p2 = X - P$ |
| | $-T/2 \leq Y \leq T/2$ | | $t2 = Y$ |
| | $P/2 \leq X \leq 3P/2$ | Fourth camera | $p4 = X - P$ |
| | $T/2 < Y \leq 3T/2$ | | $t4 = Y - T$ |

In the image displaying systems according to the embodiments described above, in order to determine the position of the display area AD from an imaging condition (p, t), a plurality of cameras including the first camera 11 and the second camera 12 must be installed with a high degree of accuracy. In the case of the first embodiment for example, the first camera 11 and the second camera 12 are installed in such a way that the first imaging area S1 positioned on the right-upper corner of the first area A1 is adjacent to the second imaging area S2 positioned on the left-upper corner of the second area A2 whereas the first imaging area S1 positioned on the right-lower corner of the first area A1 is adjacent to the second imaging area S2 positioned on the left-lower corner of the second area A2. The user may manually install the first camera 11 and the second camera 12 while recognizing areas from which images can be taken by the first camera 11 and the second camera 12. In addition, the user may install the first camera 11 and the second camera 12 while recognizing relative relations between the first camera 11 and the second camera 12 by making use of information generated by a variety of sensors such as the GPS (global positioning system), an electronic compass, an acceleration sensor, a gyro sensor and a displacement sensor.

Figure 16:
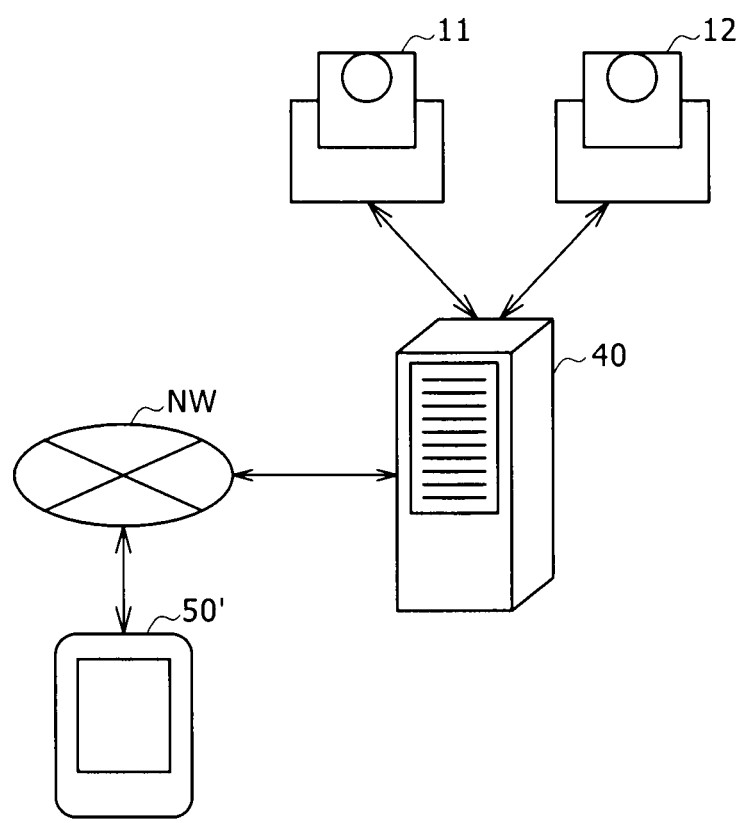
FIG. 16 is a diagram showing the configuration of another image displaying system.

As described above, the image displaying system is configured to employ a plurality of cameras including the first camera 11 and the second camera 12 as well as the image displaying apparatus 50 connected to the cameras through the network NW. However, the image displaying system can also be implemented by adoption of a technology such as a cloud-computing technology. In this case, as shown in FIG. 16, the image displaying system is configured to employ a plurality of cameras connected to a server 40 such as a camera server and an image displaying apparatus 50' connected to the server 40 through the network NW. As described above, the cameras include the first camera 11 and the second camera 12. In such an image displaying system, the image displaying apparatus 50' implements operation and display functions whereas the server 40 implements control functions.

The above descriptions have explained preferred embodiments of the present disclosure and modified versions of the embodiments in detail by referring to diagrams. However, implementations of the present disclosure are by no means limited to the embodiments and the modified versions. It is obvious that a person having ordinary knowledge in the field of technologies of the present disclosure is capable of coming up with a variety of typical changes to be made to the embodiment and a variety of typical modifications of the embodiment within a range of technological concepts described in ranges of claims appended to this specification. However, each of such typical changes and each of such typical modifications are of course also interpreted as respectively a change and a modification which fall within the ranges of the claims for the present disclosure.

For example, the above descriptions have explained a case in which the moving object O is moving from the first area A1 to the second area A2. It is needless to say, however, that a case in which the moving object O is moving in the opposite direction can also be explained as well.

The present application contains subject matter related to that disclosed in Japanese Priority Patent Application JP 2010-274781 filed in the Japan Patent Office on Dec. 9, 2010, the entire content of which is hereby incorporated by reference.

What is claimed is:

1. An image displaying apparatus connected to a first camera and a second camera, on both of which pan/tilt control can be carried out, by communication lines, said image displaying apparatus comprising:
   an information acquisition section acquiring information used for moving a display area over a virtual area obtained by combining a first area serving as the pan/tilt range of said first camera with a second area serving as the pan/tilt range of said second camera by making said first and second areas adjacent to each other;
   a control section
      monitoring position of said display area in said virtual area,
      requesting said first camera to carry out pan/tilt operations to receive an image of said display area when said display area is positioned in said first area before and after a movement of said display area, and
      requesting said second camera to carry out pan/tilt operations to receive an image of said display area when said display area has been moved from said first area to the boundary between said first and second areas; and
   an image displaying section displaying an image received from one of said first and second cameras as an image of said display area.

2. The image displaying apparatus according to claim 1 wherein, after requesting said second camera to carry out pan/tilt operations to receive an image of said display area when said display area has been moved from said first area to said boundary between said first and second areas, in a state of displaying an image included in said first area, said control section requests said first camera to terminate transmission of said image included in said first area and requests said second camera to start transmission of an image included in said second area.

3. The image displaying apparatus according to claim 1 wherein, said virtual area is an area obtained by combining said first and second areas with each other and by partially superposing said first and second areas on each other and thus has an overlap area obtained by superposing a portion of said first area on a portion of said second area;

when said display area has been moved from said first area to said boundary between said first and second areas, said control section requests:

said second camera to carry out pan/tilt operations to follow said display area moving over said overlap area;

said first camera to carry out pan/tilt operations to follow said display area moving over said overlap area till the position of said imaging area of said first camera coincides with the position of said imaging area of said second camera; and said first camera to terminate transmission of an image included in said first area and said second camera to start transmission of an image included in said second area as said position of said imaging area of said first camera coincides with said position of said imaging area of said second camera.

4. The image displaying apparatus according to claim 1 wherein zoom control can be carried out on said first and second cameras;

said information acquisition section further acquires information used for enlarging and contracting said display area; and said control section requests said second camera to carry out zoom operation to receive an image of said display area when said display area has been moved from said first area to said boundary between said first and second areas.

5. The image displaying apparatus according to claim 1 wherein said information acquisition section acquires operation information used for moving said display area from the user.

6. The image displaying apparatus according to claim 1 wherein said information acquisition section acquires object detection information used for moving said display area capturing an object, which is moving in said virtual area, in said virtual area by following the movement of said object from one of the first and second cameras.

7. An image displaying system comprising:

a first camera and a second camera, on both of which pan/tilt control can be carried out, and an image displaying apparatus connected to said first camera and said second camera, wherein said image displaying apparatus includes an information acquisition section acquiring information used for moving a display area over a virtual area obtained by combining a first area serving as the pan/tilt range of said first camera with a second area serving as the pan/tilt range of said second camera by making said first and second areas adjacent to each other;

a control section monitoring position of said display area in said virtual area, requesting said first camera to carry out pan/tilt operations to receive an image of said display area when said display area is positioned in said first area before and after a movement of said display area, and requesting said second camera to carry out pan/tilt operations to receive an image of said display area when said display area has been moved from said first area to the boundary between said first and second areas; and an image displaying section displaying an image received from one of said first or second cameras as an image of said display area.

8. An image displaying method making use of a first camera and a second camera, on both of which pan/tilt control can be carried out, as well as an image displaying apparatus connected to said first and second cameras by communication lines, said image displaying method comprising:

acquiring information used for moving a display area over a virtual area obtained by combining a first area serving as the pan/tilt range of said first camera with a second area serving as the pan/tilt range of said second camera by making said first and second areas adjacent to each other;

monitoring position of said display area in said virtual area;

requesting said first camera to carry out pan/tilt operations to receive an image of said display area when said display area is positioned in said first area before and after a movement of said display area;

requesting said second camera to carry out pan/tilt operations to receive an image of said display area when said display area has been moved from said first area to the boundary between said first and second areas; and displaying an image received from one of said first and second cameras as an image of said display area.

9. A non-transitory computer-readable storage medium having stored thereon, a set of computer-executable instructions for causing a computer to perform an image displaying method making use of a first camera and a second camera, on both of which pan/tilt control can be carried out, as well as an image displaying apparatus connected to said first and second cameras by communication lines, wherein said image displaying method comprises:

acquiring information used for moving a display area over a virtual area obtained by combining a first area serving as the pan/tilt range of said first camera with a second area serving as the pan/tilt range of said second camera by making said first and second areas adjacent to each other;

monitoring position of said display area in said virtual area;

requesting said first camera to carry out pan/tilt operations to receive an image of said display area when said display area is positioned in said first area before and after a movement of said display area;

requesting said second camera to carry out pan/tilt operations to receive an image of said display area when said display area has been moved from said first area to the boundary between said first and second areas; and displaying an image received from one of said first and second cameras-as an image of said display area.

* * * * *